(12) United States Patent
Trisnadi et al.

(10) Patent No.: US 7,054,515 B1
(45) Date of Patent: May 30, 2006

(54) DIFFRACTIVE LIGHT MODULATOR-BASED DYNAMIC EQUALIZER WITH INTEGRATED SPECTRAL MONITOR

(75) Inventors: Jahja I. Trisnadi, Cupertino, CA (US); Clinton B. Carlisle, Palo Alto, CA (US); Vlastimil Cejna, Mountain View, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 635 days.

(21) Appl. No.: 10/159,330

(22) Filed: May 30, 2002

(51) Int. Cl.
*G02B 6/12* (2006.01)

(52) U.S. Cl. .............................. 385/14; 385/25; 385/48; 385/140

(58) Field of Classification Search .................. 385/14, 385/25, 48, 140
See application file for complete search history.

(56) References Cited

U.S. PATENT DOCUMENTS

| | | |
|---|---|---|
| 1,525,550 A | 2/1925 | Jenkins |
| 1,548,262 A | 8/1925 | Freedman |
| RE16,767 E | 10/1927 | Jenkins |
| 1,814,701 A | 7/1931 | Ives |
| 2,415,226 A | 2/1947 | Sziklai ......................... 178/5.4 |
| 2,783,406 A | 2/1957 | Vanderhooft ................. 313/70 |
| 2,920,529 A | 1/1960 | Blythe ........................... 88/73 |
| 2,991,690 A | 7/1961 | Grey et al. ................... 88/16.6 |
| RE25,169 E | 5/1962 | Glenn |
| 3,256,465 A | 6/1966 | Weissenstern et al. ...... 317/101 |
| 3,388,301 A | 6/1968 | James ........................ 317/234 |
| 3,443,871 A | 5/1969 | Chitayat ..................... 356/106 |
| 3,553,364 A | 1/1971 | Lee ............................ 178/7.3 |
| 3,576,394 A | 4/1971 | Lee ............................ 178/7.3 |

(Continued)

FOREIGN PATENT DOCUMENTS

DE      32 33 195 A1      3/1983

(Continued)

OTHER PUBLICATIONS

Sene et al., "Polysilicon micromechanical gratings for optical modulation," Sensors and Actuators, vol. A57, pp. 145-151, 1996.

(Continued)

*Primary Examiner*—Rodney Bovernick
*Assistant Examiner*—Sung Pak
(74) *Attorney, Agent, or Firm*—Okamoto & Benedicto LLP

(57) ABSTRACT

An integrated device of the present invention comprises free-space optics, a bi-directional multiplexor/de-multiplexor, a diffractive light modulator, a beam splitter, an optical performance monitor, and a controller. The free-space optics collimate, transform and image optical signals including a range of component wavelength signals. The bi-directional multiplexor/de-multiplexor de-multiplexes a wavelength division multiplexed signal into the component wavelength signals and multiplexes equalized component wavelength signals into an equalized wavelength division multiplexed signal. The diffractive light modulator selectively equalizes each component wavelength signal. The beam splitter is optically coupled in free-space to the diffractive light modulator for receiving the equalized component wavelength signals and re-directing a representative portion of each of the equalized component wavelength signals. The optical performance monitor receives and detects relative power levels of each representative portion of the equalized component wavelength signals. The controller receives the detected power levels, provides feedback signals and dynamically modulates the diffractive light modulator in response thereto to maintain a desired level of each of the equalized component wavelength signals.

18 Claims, 4 Drawing Sheets

U.S. PATENT DOCUMENTS

| | | | |
|---|---|---|---|
| 3,600,798 A | 8/1971 | Lee | 29/592 |
| 3,656,837 A | 4/1972 | Sandbank | 350/161 |
| 3,657,610 A | 4/1972 | Yamamoto et al. | 317/243 |
| 3,693,239 A | 9/1972 | Dix | 29/470 |
| 3,743,507 A | 7/1973 | Ih et al. | 96/81 |
| 3,752,563 A | 8/1973 | Torok et al. | 350/151 |
| 3,781,465 A | 12/1973 | Ernstoff et al. | 178/5.4 BD |
| 3,783,184 A | 1/1974 | Ernstoff et al. | 178/5.4 BD |
| 3,792,916 A | 2/1974 | Sarna | 350/163 |
| 3,802,769 A | 4/1974 | Rotz et al. | 352/43 |
| 3,811,186 A | 5/1974 | Larmerd et al. | 29/626 |
| 3,861,784 A | 1/1975 | Torok | 350/162 R |
| 3,862,360 A | 1/1975 | Dill et al. | 178/7.3 D |
| 3,871,014 A | 3/1975 | King et al. | 357/67 |
| 3,886,310 A | 5/1975 | Guldberg et al. | 178/7.5 D |
| 3,896,338 A | 7/1975 | Nathanson et al. | 315/373 |
| 3,915,548 A | 10/1975 | Opittek | 350/3.5 |
| 3,935,499 A | 1/1976 | Oess | 313/413 |
| 3,935,500 A | 1/1976 | Oess et al. | 313/495 |
| 3,938,881 A | 2/1976 | Biegelsen et al. | 350/161 |
| 3,941,456 A | 3/1976 | Schilz et al. | 350/161 |
| 3,942,245 A | 3/1976 | Jackson et al. | 29/591 |
| 3,943,281 A | 3/1976 | Keller et al. | 178/7.5 D |
| 3,947,105 A | 3/1976 | Smith | 353/121 |
| 3,969,611 A | 7/1976 | Fonteneau | 219/502 |
| 3,980,476 A | 9/1976 | Wysocki | 96/1.1 |
| 3,991,416 A | 11/1976 | Byles et al. | 340/324 R |
| 4,001,663 A | 1/1977 | Bray | 321/2 |
| 4,004,849 A | 1/1977 | Shattuck | 350/160 R |
| 4,006,968 A | 2/1977 | Ernstoff et al. | 350/160 LC |
| 4,009,939 A | 3/1977 | Okano | 350/162 SF |
| 4,011,009 A | 3/1977 | Lama et al. | 350/162 R |
| 4,012,116 A | 3/1977 | Yevick | 350/132 |
| 4,012,835 A | 3/1977 | Wallick | 29/591 |
| 4,017,158 A | 4/1977 | Booth | 350/162 SF |
| 4,020,381 A | 4/1977 | Oess et al. | 313/302 |
| 4,021,766 A | 5/1977 | Aine | 338/2 |
| 4,034,211 A | 7/1977 | Horst et al. | 235/61.12 N |
| 4,034,399 A | 7/1977 | Drukier et al. | 357/68 |
| 4,035,068 A | 7/1977 | Rawson | 353/122 |
| 4,067,129 A | 1/1978 | Abramson et al. | 40/563 |
| 4,084,437 A | 4/1978 | Finnegan | 73/361 |
| 4,090,219 A | 5/1978 | Ernstoff et al. | 358/59 |
| 4,093,346 A | 6/1978 | Nishino et al. | 350/162 SF |
| 4,093,921 A | 6/1978 | Buss | 325/459 |
| 4,093,922 A | 6/1978 | Buss | 325/459 |
| 4,100,579 A | 7/1978 | Ernstoff | 358/230 |
| 4,103,273 A | 7/1978 | Keller | 338/2 |
| 4,126,380 A | 11/1978 | Borm | 350/161 |
| 4,127,322 A | 11/1978 | Jacobson et al. | 353/31 |
| 4,135,502 A | 1/1979 | Peck | 128/76.5 |
| 4,139,257 A | 2/1979 | Matsumoto | 350/6.1 |
| 4,143,943 A | 3/1979 | Rawson | 350/120 |
| 4,163,570 A | 8/1979 | Greenaway | 283/8 A |
| 4,184,700 A | 1/1980 | Greenaway | 283/6 |
| 4,185,891 A | 1/1980 | Kaestner | 350/167 |
| 4,190,855 A | 2/1980 | Inoue | 357/80 |
| 4,195,915 A | 4/1980 | Lichty et al. | 350/345 |
| 4,205,428 A | 6/1980 | Ernstoff et al. | 29/592 R |
| 4,211,918 A | 7/1980 | Nyfeler et al. | 235/454 |
| 4,223,050 A | 9/1980 | Nyfeler et al. | 427/163 |
| 4,225,913 A | 9/1980 | Bray | 363/97 |
| 4,249,796 A | 2/1981 | Sincerbox et al. | 350/370 |
| 4,250,217 A | 2/1981 | Greenaway | 428/161 |
| 4,250,393 A | 2/1981 | Greenaway | 250/566 |
| 4,256,787 A | 3/1981 | Shaver et al. | 428/1 |
| 4,257,016 A | 3/1981 | Kramer, Jr. et al. | 322/7.51 |
| 4,257,053 A | 3/1981 | Gilbreath | |
| 4,290,672 A | 9/1981 | Whitefield | 350/358 |
| 4,295,145 A | 10/1981 | Latta | 346/108 |
| 4,311,999 A | 1/1982 | Upton et al. | 340/755 |
| 4,327,411 A | 4/1982 | Turner | 364/900 |
| 4,327,966 A | 5/1982 | Bloom | 350/162 R |
| 4,331,972 A | 5/1982 | Rajchman | 358/60 |
| 4,336,982 A | 6/1982 | Rector, Jr. | 350/358 |
| 4,338,660 A | 7/1982 | Kelley et al. | 364/200 |
| 4,343,535 A | 8/1982 | Bleha, Jr. | 350/342 |
| 4,346,965 A | 8/1982 | Sprague et al. | 350/358 |
| 4,348,079 A | 9/1982 | Johnson | 350/358 |
| 4,355,463 A | 10/1982 | Burns | 29/827 |
| 4,361,384 A | 11/1982 | Bosserman | 350/174 |
| 4,369,524 A | 1/1983 | Rawson et al. | 455/606 |
| 4,374,397 A | 2/1983 | Mir | 358/75 |
| 4,389,096 A | 6/1983 | Hori et al. | 350/339 R |
| 4,391,490 A | 7/1983 | Hartke | 350/356 |
| 4,396,246 A | 8/1983 | Holman | 350/96.14 |
| 4,398,798 A | 8/1983 | Krawczak et al. | 350/162.24 |
| 4,400,740 A | 8/1983 | Traino et al. | 358/293 |
| 4,408,884 A | 10/1983 | Kleinknecht et al. | 356/355 |
| 4,414,583 A | 11/1983 | Hooker, III | 358/300 |
| 4,417,386 A | 11/1983 | Exner | 29/590 |
| 4,418,397 A | 11/1983 | Brantingham et al. | 364/900 |
| 4,420,717 A | 12/1983 | Wallace et al. | 318/969 |
| 4,422,099 A | 12/1983 | Wolfe | 358/293 |
| 4,426,768 A | 1/1984 | Black et al. | 29/583 |
| 4,430,584 A | 2/1984 | Someshwar et al. | 307/465 |
| 4,435,041 A | 3/1984 | Torok et al. | 350/162.24 |
| 4,440,839 A | 4/1984 | Mottier | 430/2 |
| 4,443,819 A | 4/1984 | Funada et al. | 358/236 |
| 4,443,845 A | 4/1984 | Hamilton et al. | 364/200 |
| 4,447,881 A | 5/1984 | Brantingham et al. | 364/488 |
| 4,454,591 A | 6/1984 | Lou | 364/900 |
| 4,456,338 A | 6/1984 | Gelbart | 350/358 |
| 4,460,907 A | 7/1984 | Nelson | 346/153.1 |
| 4,462,046 A | 7/1984 | Spight | 358/101 |
| 4,467,342 A | 8/1984 | Tower | 357/30 |
| 4,468,725 A | 8/1984 | Venturini | 363/160 |
| 4,483,596 A | 11/1984 | Marshall | 350/385 |
| 4,484,188 A | 11/1984 | Ott | 340/728 |
| 4,487,677 A | 12/1984 | Murphy | 204/247 |
| 4,492,435 A | 1/1985 | Banton et al. | 350/360 |
| 4,503,494 A | 3/1985 | Hamilton et al. | 364/200 |
| 4,511,220 A | 4/1985 | Scully | 350/403 |
| 4,538,883 A | 9/1985 | Sprague et al. | 350/356 |
| 4,545,610 A | 10/1985 | Lakritz et al. | 29/589 |
| 4,556,378 A | 12/1985 | Nyfeler et al. | 425/143 |
| 4,558,171 A | 12/1985 | Gantley et al. | 174/52 FP |
| 4,561,011 A | 12/1985 | Kohara et al. | |
| 4,561,044 A | 12/1985 | Ogura et al. | 362/84 |
| 4,566,935 A | 1/1986 | Hornbeck | 156/626 |
| 4,567,585 A | 1/1986 | Gelbart | 369/97 |
| 4,571,041 A | 2/1986 | Gaudyn | 353/10 |
| 4,571,603 A | 2/1986 | Hornbeck et al. | 346/160 |
| 4,577,932 A | 3/1986 | Gelbart | 350/358 |
| 4,577,933 A | 3/1986 | Yip et al. | 350/358 |
| 4,588,957 A | 5/1986 | Balant et al. | 330/4.3 |
| 4,590,548 A | 5/1986 | Maytum | 363/161 |
| 4,594,501 A | 6/1986 | Culley et al. | 219/492 |
| 4,596,992 A | 6/1986 | Hornbeck | 346/76 PH |
| 4,615,595 A | 10/1986 | Hornbeck | 353/122 |
| 4,623,219 A | 11/1986 | Trias | 350/351 |
| 4,636,039 A | 1/1987 | Turner | 350/356 |
| 4,636,866 A | 1/1987 | Hattori | 358/236 |
| 4,641,193 A | 2/1987 | Glenn | 358/233 |
| 4,645,881 A | 2/1987 | LeToumelin et al. | 379/252 |
| 4,646,158 A | 2/1987 | Ohno et al. | 358/236 |
| 4,649,085 A | 3/1987 | Landram | 428/620 |
| 4,649,432 A | 3/1987 | Watanabe et al. | 358/241 |
| 4,652,932 A | 3/1987 | Miyajima et al. | 358/236 |
| 4,655,539 A | 4/1987 | Caulfield et al. | 350/3.6 |
| 4,660,938 A | 4/1987 | Kazan | 350/355 |
| 4,661,828 A | 4/1987 | Miller, Jr. et al. | 346/108 |
| 4,662,746 A | 5/1987 | Hornbeck | 350/269 |
| 4,663,670 A | 5/1987 | Ito et al. | 358/245 |

| Patent No. | Date | Inventor | Class |
|---|---|---|---|
| 4,687,326 A | 8/1987 | Corby, Jr. | 356/5 |
| 4,698,602 A | 10/1987 | Armitage | 332/7.51 |
| 4,700,276 A | 10/1987 | Freyman et al. | 361/403 |
| 4,707,064 A | 11/1987 | Dobrowolski et al. | 350/96.19 |
| 4,709,995 A | 12/1987 | Kuribayashi et al. | 350/350 |
| 4,710,732 A | 12/1987 | Hornbeck | 332/7.51 |
| 4,711,526 A | 12/1987 | Hennings et al. | 350/170 |
| 4,714,326 A | 12/1987 | Usui et al. | 350/485 |
| 4,717,066 A | 1/1988 | Goldenberg et al. | 228/179 |
| 4,719,507 A | 1/1988 | Bos | 358/92 |
| 4,721,629 A | 1/1988 | Sakai et al. | 427/35 |
| 4,722,593 A | 2/1988 | Shimazaki | 350/336 |
| 4,724,467 A | 2/1988 | Yip et al. | 355/71 |
| 4,728,185 A | 3/1988 | Thomas | 353/122 |
| 4,743,091 A | 5/1988 | Gelbart | 350/252 |
| 4,744,633 A | 5/1988 | Sheiman | 350/132 |
| 4,747,671 A | 5/1988 | Takahashi et al. | 350/336 |
| 4,751,509 A | 6/1988 | Kubota et al. | 340/784 |
| 4,761,253 A | 8/1988 | Antes | 264/1.3 |
| 4,763,975 A | 8/1988 | Scifres et al. | 350/96.15 |
| 4,765,865 A | 8/1988 | Gealer et al. | 156/547 |
| 4,772,094 A | 9/1988 | Sheiman | 350/133 |
| 4,797,694 A | 1/1989 | Agostinelli et al. | 346/160 |
| 4,797,918 A | 1/1989 | Lee et al. | 380/20 |
| 4,801,194 A | 1/1989 | Agostinelli et al. | 350/356 |
| 4,803,560 A | 2/1989 | Matsunaga et al. | 359/236 |
| 4,804,641 A | 2/1989 | Arlt et al. | 437/227 |
| 4,807,021 A | 2/1989 | Okumura | 357/75 |
| 4,807,965 A | 2/1989 | Garakani | 350/131 |
| 4,809,078 A | 2/1989 | Yabe et al. | 358/236 |
| 4,811,082 A | 3/1989 | Jacobs et al. | 357/80 |
| 4,811,210 A | 3/1989 | McAulay | 364/200 |
| 4,814,759 A | 3/1989 | Gombrich et al. | 340/771 |
| 4,817,850 A | 4/1989 | Wiener-Avnear et al. | 228/119 |
| 4,824,200 A | 4/1989 | Isono et al. | 350/96.16 |
| 4,827,391 A | 5/1989 | Sills | 363/41 |
| 4,829,365 A | 5/1989 | Eichenlaub | 358/3 |
| 4,836,649 A | 6/1989 | Ledebuhr et al. | 350/331 R |
| 4,856,863 A | 8/1989 | Sampsell et al. | 350/96.16 |
| 4,856,869 A | 8/1989 | Sakata et al. | 350/162.18 |
| 4,859,012 A | 8/1989 | Cohn | 350/96.24 |
| 4,859,060 A | 8/1989 | Katagiri et al. | 356/352 |
| 4,866,488 A | 9/1989 | Frensley | 357/4 |
| 4,882,683 A | 11/1989 | Rupp et al. | 364/521 |
| 4,893,509 A | 1/1990 | MacIver et al. | 73/517 AV |
| 4,896,325 A | 1/1990 | Coldren | 372/20 |
| 4,896,948 A | 1/1990 | Dono et al. | 350/355 |
| 4,897,708 A | 1/1990 | Clements | 357/65 |
| 4,902,083 A | 2/1990 | Wells | 350/6.6 |
| 4,915,463 A | 4/1990 | Barbee, Jr. | 350/1.1 |
| 4,915,479 A | 4/1990 | Clarke | 350/345 |
| 4,924,413 A | 5/1990 | Suwannukul | 364/521 |
| 4,926,241 A | 5/1990 | Carey | 357/75 |
| 4,930,043 A | 5/1990 | Wiegand | 361/283 |
| 4,934,773 A | 6/1990 | Becker | 350/6.6 |
| 4,940,309 A | 7/1990 | Baum | 350/171 |
| 4,943,815 A | 7/1990 | Aldrich et al. | 346/108 |
| 4,945,773 A | 8/1990 | Sickafus | 73/862.59 |
| 4,949,148 A | 8/1990 | Bartelink | 357/74 |
| 4,950,890 A | 8/1990 | Gelbart | 250/237 G |
| 4,952,925 A | 8/1990 | Haastert | 340/784 |
| 4,954,789 A | 9/1990 | Sampsell | 330/4.3 |
| 4,956,619 A | 9/1990 | Hornbeck | 330/4.3 |
| 4,961,633 A | 10/1990 | Ibrahim et al. | 350/392 |
| 4,963,012 A | 10/1990 | Tracy et al. | 350/641 |
| 4,970,575 A | 11/1990 | Soga et al. | 357/72 |
| 4,978,202 A | 12/1990 | Yang | 350/331 R |
| 4,982,184 A | 1/1991 | Kirkwood | 340/783 |
| 4,982,265 A | 1/1991 | Watanabe et al. | 357/75 |
| 4,984,824 A | 1/1991 | Antes et al. | 283/81 |
| 4,999,308 A | 3/1991 | Nishiura et al. | 437/4 |
| 5,003,300 A | 3/1991 | Wells | 340/705 |
| 5,009,473 A | 4/1991 | Hunter et al. | 350/6.6 |
| 5,013,141 A | 5/1991 | Sakata | 350/348 |
| 5,018,256 A | 5/1991 | Hornbeck | 29/25.01 |
| 5,022,750 A | 6/1991 | Flasck | 353/31 |
| 5,023,905 A | 6/1991 | Wells et al. | 379/96 |
| 5,024,494 A | 6/1991 | Williams et al. | 350/3.6 |
| 5,028,939 A | 7/1991 | Hornbeck et al. | 346/160 |
| 5,031,144 A | 7/1991 | Persky | |
| 5,035,473 A | 7/1991 | Kuwayama et al. | 350/3.7 |
| 5,037,173 A | 8/1991 | Sampsell et al. | 385/17 |
| 5,039,628 A | 8/1991 | Carey | 437/183 |
| 5,040,052 A | 8/1991 | McDavid | 357/80 |
| 5,041,395 A | 8/1991 | Steffen | 437/206 |
| 5,041,851 A | 8/1991 | Nelson | 346/160 |
| 5,043,917 A | 8/1991 | Okamoto | 364/518 |
| 5,048,077 A | 9/1991 | Wells et al. | 379/96 |
| 5,049,901 A | 9/1991 | Gelbart | 346/108 |
| 5,058,992 A | 10/1991 | Takahashi | 359/567 |
| 5,060,058 A | 10/1991 | Goldenberg et al. | 358/60 |
| 5,061,049 A | 10/1991 | Hornbeck | 359/224 |
| 5,066,614 A | 11/1991 | Dunaway et al. | 437/209 |
| 5,068,205 A | 11/1991 | Baxter et al. | 437/205 |
| 5,072,239 A | 12/1991 | Mitcham et al. | 346/108 |
| 5,072,418 A | 12/1991 | Boutaud et al. | 364/715.06 |
| 5,074,947 A | 12/1991 | Estes et al. | 156/307.3 |
| 5,075,940 A | 12/1991 | Kuriyama et al. | 29/25.03 |
| 5,079,544 A | 1/1992 | DeMond et al. | 340/701 |
| 5,081,617 A | 1/1992 | Gelbart | 369/112 |
| 5,083,857 A | 1/1992 | Hornbeck | 359/291 |
| 5,085,497 A | 2/1992 | Um et al. | 359/848 |
| 5,089,903 A | 2/1992 | Kuwayama et al. | 359/15 |
| 5,093,281 A | 3/1992 | Eshima | 437/217 |
| 5,096,279 A | 3/1992 | Hornbeck et al. | 359/230 |
| 5,099,353 A | 3/1992 | Hornbeck | 359/291 |
| 5,101,184 A | 3/1992 | Antes | 235/454 |
| 5,101,236 A | 3/1992 | Nelson et al. | 355/229 |
| 5,103,334 A | 4/1992 | Swanberg | 359/197 |
| 5,105,207 A | 4/1992 | Nelson | 346/160 |
| 5,105,299 A | 4/1992 | Anderson et al. | 359/223 |
| 5,105,369 A | 4/1992 | Nelson | 364/525 |
| 5,107,372 A | 4/1992 | Gelbart et al. | 359/824 |
| 5,112,436 A | 5/1992 | Bol | 156/643 |
| 5,113,272 A | 5/1992 | Reamey | 359/53 |
| 5,113,285 A | 5/1992 | Franklin et al. | 359/465 |
| 5,115,344 A | 5/1992 | Jaskie | 359/573 |
| 5,119,204 A | 6/1992 | Hashimoto et al. | 358/254 |
| 5,121,343 A | 6/1992 | Faris | 395/111 |
| 5,126,812 A | 6/1992 | Greiff | 357/25 |
| 5,126,826 A | 6/1992 | Kauchi et al. | 357/72 |
| 5,126,836 A | 6/1992 | Um | 358/60 |
| 5,128,660 A | 7/1992 | DeMond et al. | 340/707 |
| 5,129,716 A | 7/1992 | Holakovszky et al. | 351/50 |
| 5,132,723 A | 7/1992 | Gelbart | 355/40 |
| 5,132,812 A | 7/1992 | Takahashi et al. | 359/9 |
| 5,136,695 A | 8/1992 | Goldshlag et al. | 395/275 |
| 5,137,836 A | 8/1992 | Lam | 437/8 |
| 5,142,303 A | 8/1992 | Nelson | 346/108 |
| 5,142,405 A | 8/1992 | Hornbeck | 359/226 |
| 5,142,677 A | 8/1992 | Ehlig et al. | 395/650 |
| 5,144,472 A | 9/1992 | Sang, Jr. et al. | 359/254 |
| 5,147,815 A | 9/1992 | Casto | 437/51 |
| 5,148,157 A | 9/1992 | Florence | 340/783 |
| 5,148,506 A | 9/1992 | McDonald | 385/16 |
| 5,149,405 A | 9/1992 | Bruns et al. | 204/129.1 |
| 5,150,205 A | 9/1992 | Um et al. | 358/60 |
| 5,151,718 A | 9/1992 | Nelson | 346/160 |
| 5,151,724 A | 9/1992 | Kikinis | 357/17 |
| 5,151,763 A | 9/1992 | Marek et al. | 357/26 |
| 5,153,770 A | 10/1992 | Harris | 359/245 |
| 5,155,604 A | 10/1992 | Miekka et al. | 359/2 |
| 5,155,615 A | 10/1992 | Tagawa | 359/213 |
| 5,155,778 A | 10/1992 | Magel et al. | 385/18 |
| 5,155,812 A | 10/1992 | Ehlig et al. | 395/275 |
| 5,157,304 A | 10/1992 | Kane et al. | 313/195 |

| Patent No. | Kind | Date | Inventor | Class |
|---|---|---|---|---|
| 5,159,485 | A | 10/1992 | Nelson | 359/291 |
| 5,161,042 | A | 11/1992 | Hamada | 359/41 |
| 5,162,787 | A | 11/1992 | Thompson et al. | 340/794 |
| 5,164,019 | A | 11/1992 | Sinton | 136/249 |
| 5,165,013 | A | 11/1992 | Faris | 395/104 |
| 5,168,401 | A | 12/1992 | Endriz | 359/625 |
| 5,168,406 | A | 12/1992 | Nelson | 359/855 |
| 5,170,156 | A | 12/1992 | DeMond et al. | 340/794 |
| 5,170,269 | A | 12/1992 | Lin et al. | 359/9 |
| 5,170,283 | A | 12/1992 | O'Brien et al. | 359/291 |
| 5,172,161 | A | 12/1992 | Nelson | 355/200 |
| 5,172,262 | A | 12/1992 | Hornbeck | 359/223 |
| 5,177,724 | A | 1/1993 | Gelbart | 369/44.16 |
| 5,178,728 | A | 1/1993 | Boysel et al. | 156/656 |
| 5,179,274 | A | 1/1993 | Sampsell | 250/208.2 |
| 5,179,367 | A | 1/1993 | Shimizu | 340/700 |
| 5,181,231 | A | 1/1993 | Parikh et al. | 377/26 |
| 5,182,665 | A | 1/1993 | O'Callaghan et al. | 359/95 |
| 5,185,660 | A | 2/1993 | Um | 358/60 |
| 5,185,823 | A | 2/1993 | Kaku et al. | |
| 5,188,280 | A | 2/1993 | Nakao et al. | 228/123 |
| 5,189,404 | A | 2/1993 | Masimo et al. | 340/720 |
| 5,189,505 | A | 2/1993 | Bartelink | 257/419 |
| 5,191,405 | A | 3/1993 | Tomita et al. | 257/777 |
| 5,192,864 | A | 3/1993 | McEwen et al. | 250/234 |
| 5,192,946 | A | 3/1993 | Thompson et al. | 340/794 |
| 5,198,895 | A | 3/1993 | Vick | 358/103 |
| D334,557 | S | 4/1993 | Hunter et al. | D14/114 |
| D334,742 | S | 4/1993 | Hunter et al. | D14/113 |
| 5,202,785 | A | 4/1993 | Nelson | 359/214 |
| 5,206,629 | A | 4/1993 | DeMond et al. | 340/719 |
| 5,206,829 | A | 4/1993 | Thakoor et al. | |
| 5,208,818 | A | 5/1993 | Gelbart et al. | 372/30 |
| 5,208,891 | A | 5/1993 | Prysner | 385/116 |
| 5,210,637 | A | 5/1993 | Puzey | 359/263 |
| 5,212,115 | A | 5/1993 | Cho et al. | 437/208 |
| 5,212,555 | A | 5/1993 | Stoltz | 358/206 |
| 5,212,582 | A | 5/1993 | Nelson | 359/224 |
| 5,214,308 | A | 5/1993 | Nishiguchi et al. | 257/692 |
| 5,214,419 | A | 5/1993 | DeMond et al. | 340/794 |
| 5,214,420 | A | 5/1993 | Thompson et al. | 340/795 |
| 5,216,278 | A | 6/1993 | Lin et al. | |
| 5,216,537 | A | 6/1993 | Hornbeck | 359/291 |
| 5,216,544 | A | 6/1993 | Horikawa et al. | 359/622 |
| 5,219,794 | A | 6/1993 | Satoh et al. | 437/209 |
| 5,220,200 | A | 6/1993 | Blanton | 257/778 |
| 5,221,400 | A | 6/1993 | Staller et al. | 156/292 |
| 5,221,982 | A | 6/1993 | Faris | 359/93 |
| 5,224,088 | A | 6/1993 | Atiya | 369/97 |
| D337,320 | S | 7/1993 | Hunter et al. | D14/113 |
| 5,226,099 | A | 7/1993 | Mignardi et al. | 385/19 |
| 5,229,597 | A | 7/1993 | Fukatsu | |
| 5,230,005 | A | 7/1993 | Rubino et al. | 372/20 |
| 5,231,363 | A | 7/1993 | Sano et al. | 332/109 |
| 5,231,388 | A | 7/1993 | Stoltz | 340/783 |
| 5,231,432 | A | 7/1993 | Glenn | 353/31 |
| 5,233,456 | A | 8/1993 | Nelson | 359/214 |
| 5,233,460 | A | 8/1993 | Partlo et al. | 359/247 |
| 5,233,874 | A | 8/1993 | Putty et al. | 73/517 AV |
| 5,237,340 | A | 8/1993 | Nelson | 346/108 |
| 5,237,435 | A | 8/1993 | Kurematsu et al. | 359/41 |
| 5,239,448 | A | 8/1993 | Perkins et al. | 361/764 |
| 5,239,806 | A | 8/1993 | Maslakow | 53/432 |
| 5,240,818 | A | 8/1993 | Mignardi et al. | 430/321 |
| 5,245,686 | A | 9/1993 | Faris et al. | 385/120 |
| 5,247,180 | A | 9/1993 | Mitcham et al. | 250/492.1 |
| 5,247,593 | A | 9/1993 | Lin et al. | 385/17 |
| 5,249,245 | A | 9/1993 | Lebby et al. | 385/89 |
| 5,251,057 | A | 10/1993 | Guerin et al. | 359/249 |
| 5,251,058 | A | 10/1993 | MacArthur | 359/249 |
| 5,254,980 | A | 10/1993 | Hendrix et al. | 345/84 |
| 5,255,100 | A | 10/1993 | Urbanus | 358/231 |
| 5,256,869 | A | 10/1993 | Lin et al. | 250/201.9 |
| 5,258,325 | A | 11/1993 | Spitzer et al. | 437/86 |
| 5,260,718 | A | 11/1993 | Rommelmann et al. | 346/107 R |
| 5,260,798 | A | 11/1993 | Um et al. | 358/233 |
| 5,262,000 | A | 11/1993 | Welbourn et al. | 156/643 |
| 5,272,473 | A | 12/1993 | Thompson et al. | 345/7 |
| 5,278,652 | A | 1/1994 | Urbanus et al. | 358/160 |
| 5,278,925 | A | 1/1994 | Boysel et al. | 385/14 |
| 5,280,277 | A | 1/1994 | Hornbeck | 345/108 |
| 5,281,887 | A | 1/1994 | Engle | 310/335 |
| 5,281,957 | A | 1/1994 | Schoolman | 345/8 |
| 5,285,105 | A | 2/1994 | Cain | 257/672 |
| 5,285,196 | A | 2/1994 | Gale, Jr. | 345/108 |
| 5,285,407 | A | 2/1994 | Gale et al. | 365/189.11 |
| 5,287,096 | A | 2/1994 | Thompson et al. | 345/147 |
| 5,287,215 | A | 2/1994 | Warde et al. | 359/293 |
| 5,289,172 | A | 2/1994 | Gale, Jr. et al. | 345/108 |
| 5,291,317 | A | 3/1994 | Newswanger | 359/15 |
| 5,291,473 | A | 3/1994 | Pauli | 369/112 |
| 5,293,511 | A | 3/1994 | Poradish et al. | 257/434 |
| 5,296,408 | A | 3/1994 | Wilbarg et al. | 437/203 |
| 5,296,891 | A | 3/1994 | Vogt et al. | 355/67 |
| 5,296,950 | A | 3/1994 | Lin et al. | 359/9 |
| 5,298,460 | A | 3/1994 | Nishiguchi et al. | 437/183 |
| 5,299,037 | A | 3/1994 | Sakata | 359/41 |
| 5,299,289 | A | 3/1994 | Omae et al. | 359/95 |
| 5,300,813 | A | 4/1994 | Joshi et al. | 257/752 |
| 5,301,062 | A | 4/1994 | Takahashi et al. | 359/567 |
| 5,303,043 | A | 4/1994 | Glenn | 348/40 |
| 5,303,055 | A | 4/1994 | Hendrix et al. | 348/761 |
| 5,307,056 | A | 4/1994 | Urbanus | 340/189 |
| 5,307,185 | A | 4/1994 | Jones et al. | 359/41 |
| 5,310,624 | A | 5/1994 | Ehrlich | 430/322 |
| 5,311,349 | A | 5/1994 | Anderson et al. | 359/223 |
| 5,311,360 | A | 5/1994 | Bloom et al. | 359/572 |
| 5,312,513 | A | 5/1994 | Florence et al. | 156/643 |
| 5,313,479 | A | 5/1994 | Florence | 372/26 |
| 5,313,648 | A | 5/1994 | Ehlig et al. | 395/800 |
| 5,313,835 | A | 5/1994 | Dunn | 73/505 |
| 5,315,418 | A | 5/1994 | Sprague et al. | 359/41 |
| 5,315,423 | A | 5/1994 | Hong | 359/124 |
| 5,315,429 | A | 5/1994 | Abramov | |
| 5,319,214 | A | 6/1994 | Gregory et al. | 250/504 R |
| 5,319,668 | A | 6/1994 | Luecke | 372/107 |
| 5,319,789 | A | 6/1994 | Ehlig et al. | 395/800 |
| 5,319,792 | A | 6/1994 | Ehlig et al. | 395/800 |
| 5,320,709 | A | 6/1994 | Bowden et al. | |
| 5,321,416 | A | 6/1994 | Bassett et al. | 345/8 |
| 5,323,002 | A | 6/1994 | Sampsell et al. | 250/252.1 |
| 5,323,051 | A | 6/1994 | Adams et al. | 257/417 |
| 5,325,116 | A | 6/1994 | Sampsell | 346/108 |
| 5,327,286 | A | 7/1994 | Sampsell et al. | 359/561 |
| 5,329,289 | A | 7/1994 | Sakamoto et al. | 345/126 |
| 5,330,301 | A | 7/1994 | Brancher | 414/417 |
| 5,330,878 | A | 7/1994 | Nelson | 430/311 |
| 5,331,454 | A | 7/1994 | Hornbeck | 359/224 |
| 5,334,991 | A | 8/1994 | Wells et al. | 345/8 |
| 5,339,116 | A | 8/1994 | Urbanus et al. | 348/716 |
| 5,339,177 | A | 8/1994 | Jenkins et al. | 359/41 |
| 5,340,772 | A | 8/1994 | Rosotker | 437/226 |
| 5,345,521 | A | 9/1994 | McDonald et al. | 385/19 |
| 5,347,321 | A | 9/1994 | Gove | 348/663 |
| 5,347,378 | A | 9/1994 | Handschy et al. | 359/53 |
| 5,347,433 | A | 9/1994 | Sedlmayr | 362/32 |
| 5,348,619 | A | 9/1994 | Bohannon et al. | 156/664 |
| 5,349,687 | A | 9/1994 | Ehlig et al. | 395/800 |
| 5,351,052 | A | 9/1994 | D'Hont et al. | 342/42 |
| 5,352,926 | A | 10/1994 | Andrews | 257/717 |
| 5,354,416 | A | 10/1994 | Okudaira et al. | 156/643 |
| 5,357,369 | A | 10/1994 | Pilling et al. | 359/462 |
| 5,357,803 | A | 10/1994 | Lane | 73/517 B |
| 5,359,349 | A | 10/1994 | Jambor et al. | 345/168 |
| 5,359,451 | A | 10/1994 | Gelbart et al. | 359/285 |
| 5,361,131 | A | 11/1994 | Tekemori et al. | 356/355 |

| | | | | | | |
|---|---|---|---|---|---|---|
| 5,363,220 A | 11/1994 | Kuwayama et al. ............ 359/3 | | 5,473,512 A | 12/1995 | Degani et al. ............... 361/760 |
| 5,365,283 A | 11/1994 | Doherty et al. ............. 348/743 | | 5,475,236 A | 12/1995 | Yoshizaki ..................... 257/48 |
| 5,367,585 A | 11/1994 | Ghezzo et al. ................ 385/23 | | 5,480,839 A | 1/1996 | Ezawa et al. ................ 437/209 |
| 5,370,742 A | 12/1994 | Mitchell et al. ............... 134/10 | | 5,481,118 A | 1/1996 | Tew .......................... 250/551 |
| 5,371,543 A | 12/1994 | Anderson .................... 348/270 | | 5,481,133 A | 1/1996 | Hsu .......................... 257/621 |
| 5,371,618 A | 12/1994 | Tai et al. ..................... 359/53 | | 5,482,564 A | 1/1996 | Douglas et al. ............... 134/18 |
| 5,377,705 A | 1/1995 | Smith, Jr. et al. .......... 134/95.3 | | 5,482,818 A | 1/1996 | Nelson ........................ 430/394 |
| 5,382,961 A | 1/1995 | Gale, Jr. ..................... 345/108 | | 5,483,307 A | 1/1996 | Anderson .................... 353/98 |
| 5,387,924 A | 2/1995 | Gale, Jr. et al. ............. 345/108 | | 5,485,172 A | 1/1996 | Sawachika et al. ............ 345/8 |
| 5,389,182 A | 2/1995 | Mignardi .................... 156/344 | | 5,485,304 A | 1/1996 | Kaeriyama ................. 359/291 |
| 5,391,881 A | 2/1995 | Jeuch et al. ............ 250/370.09 | | 5,485,354 A | 1/1996 | Ciupke et al. ................ 362/31 |
| 5,392,140 A | 2/1995 | Ezra et al. .................... 359/41 | | 5,486,698 A | 1/1996 | Hanson et al. ............... 250/332 |
| 5,392,151 A | 2/1995 | Nelson ....................... 359/223 | | 5,486,841 A | 1/1996 | Hara et al. ...................... 345/8 |
| 5,394,303 A | 2/1995 | Yamaji ....................... 361/749 | | 5,486,946 A | 1/1996 | Jachimowicz et al. ....... 359/263 |
| 5,398,071 A | 3/1995 | Gove et al. .................. 348/558 | | 5,488,431 A | 1/1996 | Gove et al. .................. 348/716 |
| 5,399,898 A | 3/1995 | Rostoker ..................... 257/499 | | 5,489,952 A | 2/1996 | Gove et al. .................. 348/771 |
| 5,404,365 A | 4/1995 | Hiiro .......................... 372/27 | | 5,490,009 A | 2/1996 | Venkateswar et al. ....... 359/291 |
| 5,404,485 A | 4/1995 | Ban ........................... 395/425 | | 5,491,510 A | 2/1996 | Gove .......................... 348/77 |
| 5,408,123 A | 4/1995 | Murai ........................ 257/531 | | 5,491,612 A | 2/1996 | Nicewarner, Jr. ............ 361/760 |
| 5,410,315 A | 4/1995 | Huber ......................... 342/42 | | 5,491,715 A | 2/1996 | Flaxl .......................... 375/344 |
| 5,411,769 A | 5/1995 | Hornbeck .................... 427/534 | | 5,493,177 A | 2/1996 | Muller et al. ................ 313/578 |
| 5,412,186 A | 5/1995 | Gale .......................... 219/679 | | 5,493,439 A | 2/1996 | Engle ......................... 359/292 |
| 5,412,501 A | 5/1995 | Fisli .......................... 359/286 | | 5,497,172 A | 3/1996 | Doherty et al. ............... 345/85 |
| 5,418,584 A | 5/1995 | Larson ....................... 353/122 | | 5,497,197 A | 3/1996 | Gove et al. .................. 348/388 |
| 5,420,655 A | 5/1995 | Shimizu ....................... 353/33 | | 5,497,262 A | 3/1996 | Kaeriyama ................. 359/223 |
| 5,420,722 A | 5/1995 | Bielak ........................ 359/708 | | 5,499,060 A | 3/1996 | Gove et al. .................. 348/651 |
| 5,426,072 A | 6/1995 | Finnila ....................... 437/208 | | 5,499,062 A | 3/1996 | Urbanus ..................... 348/771 |
| 5,427,975 A | 6/1995 | Sparks et al. .................. 437/79 | | 5,500,761 A | 3/1996 | Goossen et al. ............. 359/290 |
| 5,430,524 A | 7/1995 | Nelson ....................... 355/200 | | 5,502,481 A | 3/1996 | Dentinger et al. ............ 348/51 |
| 5,435,876 A | 7/1995 | Alfaro et al. ................ 156/247 | | 5,504,504 A | 4/1996 | Markandey et al. ......... 345/214 |
| 5,438,477 A | 8/1995 | Pasch ......................... 361/689 | | 5,504,514 A | 4/1996 | Nelson ....................... 347/130 |
| 5,439,731 A | 8/1995 | Li et al. ...................... 428/209 | | 5,504,575 A | 4/1996 | Stafford ...................... 356/330 |
| 5,442,411 A | 8/1995 | Urbanus et al. ............. 348/771 | | 5,504,614 A | 4/1996 | Webb et al. .................. 359/223 |
| 5,442,414 A | 8/1995 | Janssen et al. ................ 353/98 | | 5,506,171 A | 4/1996 | Leonard et al. .............. 437/187 |
| 5,444,566 A | 8/1995 | Gale et al. ................... 359/291 | | 5,506,597 A | 4/1996 | Thompson et al. ........... 345/85 |
| 5,445,559 A | 8/1995 | Gale et al. ................... 451/388 | | 5,506,720 A | 4/1996 | Yoon .......................... 359/224 |
| 5,446,479 A | 8/1995 | Thompson et al. .......... 345/149 | | 5,508,558 A | 4/1996 | Robinette, Jr. et al. ...... 257/700 |
| 5,447,600 A | 9/1995 | Webb ........................... 216/2 | | 5,508,561 A | 4/1996 | Tago et al. ................... 257/737 |
| 5,448,314 A | 9/1995 | Heimbuch et al. .......... 348/743 | | 5,508,565 A | 4/1996 | Hatakeyama et al. ........ 257/777 |
| 5,448,546 A | 9/1995 | Pauli .......................... 369/112 | | 5,508,750 A | 4/1996 | Hewlett et al. .............. 348/558 |
| 5,450,088 A | 9/1995 | Meier et al. ................... 342/51 | | 5,508,840 A | 4/1996 | Vogel et al. ................. 359/291 |
| 5,450,219 A | 9/1995 | Gold et al. .................... 359/40 | | 5,508,841 A | 4/1996 | Lin et al. ..................... 359/318 |
| 5,451,103 A | 9/1995 | Hatanaka et al. .............. 353/31 | | 5,510,758 A | 4/1996 | Fujita et al. ................. 333/247 |
| 5,452,024 A | 9/1995 | Sampsell .................... 348/755 | | 5,510,824 A | 4/1996 | Nelson ....................... 347/239 |
| 5,452,138 A | 9/1995 | Mignardi et al. ............ 359/855 | | 5,512,374 A | 4/1996 | Wallace et al. .............. 428/422 |
| 5,453,747 A | 9/1995 | D'Hont et al. ................ 342/42 | | 5,512,748 A | 4/1996 | Hanson ...................... 250/332 |
| 5,453,778 A | 9/1995 | Venkateswar et al. ....... 347/239 | | 5,515,076 A | 5/1996 | Thompson et al. .......... 345/139 |
| 5,453,803 A | 9/1995 | Shapiro et al. .............. 353/119 | | 5,516,125 A | 5/1996 | McKenna ...................... 279/3 |
| 5,454,160 A | 10/1995 | Nickel ......................... 29/840 | | 5,517,340 A | 5/1996 | Doany et al. ................. 359/41 |
| 5,454,906 A | 10/1995 | Baker et al. .................. 216/66 | | 5,517,347 A | 5/1996 | Sampsell .................... 359/224 |
| 5,455,445 A | 10/1995 | Kurtz et al. ................. 257/419 | | 5,517,357 A | 5/1996 | Shibayama ................. 359/547 |
| 5,455,455 A | 10/1995 | Badehi ....................... 257/690 | | 5,517,359 A | 5/1996 | Gelbart ...................... 359/623 |
| 5,455,602 A | 10/1995 | Tew .......................... 347/239 | | 5,519,251 A | 5/1996 | Sato et al. ................... 257/666 |
| 5,457,493 A | 10/1995 | Leddy et al. ................ 348/164 | | 5,519,450 A | 5/1996 | Urbanus et al. ............. 348/600 |
| 5,457,566 A | 10/1995 | Sampsell et al. ............ 359/292 | | 5,521,748 A | 5/1996 | Sarraf ........................ 359/321 |
| 5,457,567 A | 10/1995 | Shinohara ................... 359/305 | | 5,523,619 A | 6/1996 | McAllister et al. ......... 257/686 |
| 5,458,716 A | 10/1995 | Alfaro et al. ................ 156/245 | | 5,523,628 A | 6/1996 | Williams et al. ............ 257/777 |
| 5,459,492 A | 10/1995 | Venkateswar ............... 347/253 | | 5,523,803 A | 6/1996 | Urbanus et al. ............. 348/771 |
| 5,459,528 A | 10/1995 | Pettitt ........................ 348/568 | | 5,523,878 A | 6/1996 | Wallace et al. .............. 359/290 |
| 5,459,592 A | 10/1995 | Shibatani et al. .............. 359/40 | | 5,523,881 A | 6/1996 | Florence et al. ............. 359/561 |
| 5,459,610 A | 10/1995 | Bloom et al. ................ 359/572 | | 5,523,920 A | 6/1996 | Machuga et al. ............ 361/767 |
| 5,461,197 A | 10/1995 | Hiruta et al. ............... 174/52.4 | | 5,524,155 A | 6/1996 | Weaver ........................ 385/24 |
| 5,461,410 A | 10/1995 | Venkateswar et al. ....... 347/240 | | 5,526,834 A | 6/1996 | Mielnik et al. .............. 134/105 |
| 5,461,411 A | 10/1995 | Florence et al. ............. 347/240 | | 5,534,107 A | 7/1996 | Gray et al. ................ 156/643.1 |
| 5,461,547 A | 10/1995 | Ciupke et al. ................ 362/31 | | 5,534,883 A | 7/1996 | Koh .............................. 345/3 |
| 5,463,347 A | 10/1995 | Jones et al. .................. 330/253 | | 5,539,422 A | 7/1996 | Heacock et al. ............... 345/8 |
| 5,463,497 A | 10/1995 | Muraki et al. ............... 359/618 | | 5,544,306 A | 8/1996 | Deering et al. .............. 395/164 |
| 5,465,175 A | 11/1995 | Woodgate et al. ........... 359/463 | | 5,552,635 A | 9/1996 | Kim et al. |
| 5,467,106 A | 11/1995 | Salomon ...................... 345/87 | | 5,554,304 A | 9/1996 | Suzuki ......................... 216/2 |
| 5,467,138 A | 11/1995 | Gove ......................... 345/452 | | 5,576,878 A | 11/1996 | Henck ........................ 359/224 |
| 5,467,146 A | 11/1995 | Huang et al. ................ 348/743 | | 5,602,671 A | 2/1997 | Hornbeck ................... 359/224 |
| 5,469,302 A | 11/1995 | Lim .......................... 359/846 | | 5,606,181 A | 2/1997 | Sakuma et al. ............... 257/88 |
| 5,471,341 A | 11/1995 | Warde et al. ................ 359/293 | | 5,606,447 A | 2/1997 | Asada et al. ................. 359/199 |

| Patent No. | Date | Inventor(s) | Class |
|---|---|---|---|
| 5,610,438 A | 3/1997 | Wallace et al. | 257/682 |
| 5,623,361 A | 4/1997 | Engle | 359/291 |
| 5,629,566 A | 5/1997 | Doi et al. | 257/789 |
| 5,629,801 A | 5/1997 | Staker et al. | 359/572 |
| 5,640,216 A | 6/1997 | Hasegawa et al. | 349/58 |
| 5,658,698 A | 8/1997 | Yagi et al. | 430/11 |
| 5,661,592 A | 8/1997 | Bornstein et al. | 359/291 |
| 5,661,593 A | 8/1997 | Engle | 359/292 |
| 5,663,817 A | 9/1997 | Frapin et al. | 349/5 |
| 5,668,611 A | 9/1997 | Ernstoff et al. | 348/771 |
| 5,673,139 A | 9/1997 | Johnson | 359/291 |
| 5,677,783 A | 10/1997 | Bloom et al. | 359/224 |
| 5,689,361 A | 11/1997 | Damen et al. | 359/284 |
| 5,691,836 A | 11/1997 | Clark | 359/247 |
| 5,694,740 A | 12/1997 | Martin et al. | 53/431 |
| 5,696,560 A | 12/1997 | Songer | 348/436 |
| 5,699,740 A | 12/1997 | Gelbart | 101/477 |
| 5,704,700 A | 1/1998 | Kappel et al. | 353/31 |
| 5,707,160 A | 1/1998 | Bowen | 400/472 |
| 5,712,649 A | 1/1998 | Tosaki | 345/8 |
| 5,713,652 A | 2/1998 | Zavracky et al. | 353/122 |
| 5,726,480 A | 3/1998 | Pister | 257/415 |
| 5,731,802 A | 3/1998 | Aras et al. | 345/148 |
| 5,734,224 A | 3/1998 | Tagawa et al. | 313/493 |
| 5,742,373 A | 4/1998 | Alvelda | 349/204 |
| 5,744,752 A | 4/1998 | McHerron et al. | 174/52.4 |
| 5,745,271 A | 4/1998 | Ford et al. | 359/130 |
| 5,757,354 A | 5/1998 | Kawamura | 345/126 |
| 5,757,536 A | 5/1998 | Ricco et al. | 359/224 |
| 5,764,280 A | 6/1998 | Bloom et al. | 348/53 |
| 5,768,009 A | 6/1998 | Little | 359/293 |
| 5,773,473 A | 6/1998 | Green et al. | 438/26 |
| 5,793,519 A | 8/1998 | Furlani et al. | 359/291 |
| 5,798,743 A | 8/1998 | Bloom | 345/90 |
| 5,798,805 A | 8/1998 | Ooi et al. | 349/10 |
| 5,801,074 A | 9/1998 | Kim et al. | 438/125 |
| 5,802,222 A | 9/1998 | Rasch et al. | 385/1 |
| 5,808,323 A | 9/1998 | Spaeth et al. | 257/88 |
| 5,808,797 A | 9/1998 | Bloom et al. | 359/572 |
| 5,815,126 A | 9/1998 | Fan et al. | 345/8 |
| 5,825,443 A | 10/1998 | Kawasaki et al. | 349/95 |
| 5,832,148 A | 11/1998 | Yariv | |
| 5,835,255 A | 11/1998 | Miles | 359/291 |
| 5,835,256 A | 11/1998 | Huibers | 359/291 |
| 5,837,562 A | 11/1998 | Cho | 438/51 |
| 5,841,579 A | 11/1998 | Bloom et al. | 359/572 |
| 5,841,929 A | 11/1998 | Komatsu et al. | |
| 5,844,711 A | 12/1998 | Long, Jr. | |
| 5,862,164 A | 1/1999 | Hill | 372/27 |
| 5,868,854 A | 2/1999 | Kojima et al. | 134/1.3 |
| 5,886,675 A | 3/1999 | Aye et al. | 345/7 |
| 5,892,505 A | 4/1999 | Tropper | 345/208 |
| 5,895,233 A | 4/1999 | Higashi et al. | 438/107 |
| 5,898,515 A | 4/1999 | Furlani et al. | 359/290 |
| 5,903,243 A | 5/1999 | Jones | 345/7 |
| 5,903,395 A | 5/1999 | Rallison et al. | 359/630 |
| 5,904,737 A | 5/1999 | Preston et al. | 8/158 |
| 5,910,856 A | 6/1999 | Ghosh et al. | 359/291 |
| 5,912,094 A | 6/1999 | Aksyuk et al. | 430/5 |
| 5,912,608 A | 6/1999 | Asada | 335/222 |
| 5,914,801 A | 6/1999 | Dhuler et al. | 359/230 |
| 5,915,168 A | 6/1999 | Salatino et al. | 438/110 |
| 5,919,548 A | 7/1999 | Barron et al. | 428/138 |
| 5,920,411 A | 7/1999 | Duck et al. | 359/127 |
| 5,920,418 A | 7/1999 | Shiono et al. | 359/254 |
| 5,923,475 A | 7/1999 | Kurtz et al. | 359/619 |
| 5,926,309 A | 7/1999 | Little | 359/293 |
| 5,926,318 A | 7/1999 | Hebert | 359/618 |
| 5,942,791 A | 8/1999 | Shorrocks et al. | 257/522 |
| 5,949,390 A | 9/1999 | Nomura et al. | 345/32 |
| 5,949,570 A | 9/1999 | Shiono et al. | 359/291 |
| 5,953,161 A | 9/1999 | Troxell et al. | 359/618 |
| 5,955,771 A | 9/1999 | Kurtz et al. | 257/419 |
| 5,963,788 A | 10/1999 | Barron et al. | 438/48 |
| 5,978,127 A | 11/1999 | Berg | 359/279 |
| 5,986,634 A | 11/1999 | Alioshin et al. | 345/126 |
| 5,986,796 A | 11/1999 | Miles | 359/260 |
| 5,995,303 A | 11/1999 | Honguh et al. | 359/577 |
| 5,999,319 A | 12/1999 | Castracane | 359/573 |
| 6,004,912 A | 12/1999 | Gudeman | 508/577 |
| 6,012,336 A | 1/2000 | Eaton et al. | |
| 6,016,222 A | 1/2000 | Setani et al. | 359/571 |
| 6,025,859 A | 2/2000 | Ide et al. | 347/135 |
| 6,038,057 A | 3/2000 | Brazas, Jr. et al. | 359/291 |
| 6,040,748 A | 3/2000 | Gueissaz | 335/78 |
| 6,046,840 A | 4/2000 | Huibers | 359/291 |
| 6,055,090 A | 4/2000 | Miles | 359/291 |
| 6,057,520 A | 5/2000 | Goodwin-Johansson | 200/181 |
| 6,061,166 A | 5/2000 | Furlani et al. | 359/254 |
| 6,061,489 A | 5/2000 | Ezra et al. | 385/115 |
| 6,062,461 A | 5/2000 | Sparks et al. | 228/123.1 |
| 6,064,404 A | 5/2000 | Aras et al. | 345/507 |
| 6,069,392 A | 5/2000 | Tai et al. | 257/419 |
| 6,071,652 A | 6/2000 | Feldman et al. | 430/5 |
| 6,075,632 A | 6/2000 | Braun | 359/124 |
| 6,084,626 A | 7/2000 | Ramanujan et al. | 347/239 |
| 6,088,102 A | 7/2000 | Manhart | 356/354 |
| 6,090,717 A | 7/2000 | Powell et al. | 438/710 |
| 6,091,521 A | 7/2000 | Popovich | 359/15 |
| 6,096,576 A | 8/2000 | Corbin et al. | 438/108 |
| 6,096,656 A | 8/2000 | Matzke et al. | |
| 6,097,352 A | 8/2000 | Zavracky et al. | 345/7 |
| 6,101,036 A | 8/2000 | Bloom | 359/567 |
| 6,115,168 A | 9/2000 | Zhao et al. | 359/247 |
| 6,122,299 A | 9/2000 | DeMars et al. | 372/20 |
| 6,123,985 A | 9/2000 | Robinson et al. | 427/162 |
| 6,124,145 A | 9/2000 | Stemme et al. | 438/26 |
| 6,130,770 A | 10/2000 | Bloom | 359/224 |
| 6,144,481 A | 11/2000 | Kowarz et al. | 359/291 |
| 6,147,789 A | 11/2000 | Gelbart | 359/231 |
| 6,154,259 A | 11/2000 | Hargis et al. | 348/756 |
| 6,154,305 A | 11/2000 | Dickensheets et al. | |
| 6,163,026 A | 12/2000 | Bawolek et al. | 250/351 |
| 6,163,402 A | 12/2000 | Chou et al. | 359/443 |
| 6,169,624 B1 | 1/2001 | Godil et al. | 359/237 |
| 6,172,797 B1 | 1/2001 | Huibers | 359/291 |
| 6,177,980 B1 | 1/2001 | Johnson | 355/67 |
| 6,181,458 B1 | 1/2001 | Brazas, Jr. et al. | 359/290 |
| 6,188,519 B1 | 2/2001 | Johnson | 359/572 |
| 6,195,196 B1 | 2/2001 | Kimura et al. | 359/295 |
| 6,197,610 B1 | 3/2001 | Toda | 438/50 |
| 6,210,988 B1 | 4/2001 | Howe et al. | 438/50 |
| 6,219,015 B1 | 4/2001 | Bloom et al. | 345/87 |
| 6,222,954 B1 | 4/2001 | Riza | 385/18 |
| 6,229,650 B1 | 5/2001 | Reznichenko et al. | 359/566 |
| 6,229,683 B1 | 5/2001 | Goodwin-Johansson | 361/233 |
| 6,241,143 B1 | 6/2001 | Kuroda | 228/110.1 |
| 6,249,381 B1 | 6/2001 | Suganuma | |
| 6,251,842 B1 | 6/2001 | Gudeman | 508/577 |
| 6,252,697 B1 | 6/2001 | Hawkins et al. | 359/290 |
| 6,254,792 B1 | 7/2001 | Van Buskirk et al. | 216/13 |
| 6,261,494 B1 | 7/2001 | Zavracky et al. | 264/104 |
| 6,268,952 B1 | 7/2001 | Godil et al. | 359/291 |
| 6,271,145 B1 | 8/2001 | Toda | 438/706 |
| 6,271,808 B1 | 8/2001 | Corbin | 345/7 |
| 6,274,469 B1 | 8/2001 | Yu | 438/592 |
| 6,282,213 B1 | 8/2001 | Gutin et al. | |
| 6,286,231 B1 | 9/2001 | Bergman et al. | 34/410 |
| 6,290,859 B1 | 9/2001 | Fleming et al. | 216/2 |
| 6,290,864 B1 | 9/2001 | Patel et al. | 216/79 |
| 6,300,148 B1 | 10/2001 | Birdsley et al. | 438/15 |
| 6,303,986 B1 | 10/2001 | Shook | 257/680 |
| 6,310,018 B1 | 10/2001 | Behr et al. | 510/175 |
| 6,313,901 B1 | 11/2001 | Cacharelis | |
| 6,323,984 B1 | 11/2001 | Trisnadi | 359/245 |
| 6,327,071 B1 | 12/2001 | Kimura | 359/291 |

| | | | | | |
|---|---|---|---|---|---|
| 6,342,960 B1 | 1/2002 | McCullough ............... 359/124 | EP | 1 040 927 A2 | 10/2000 |
| 6,346,430 B1 | 2/2002 | Raj et al. | GB | 2 117 564 A | 10/1983 |
| 6,356,577 B1 | 3/2002 | Miller ........................ 372/107 | GB | 2 118 365 A | 10/1983 |
| 6,356,689 B1 | 3/2002 | Greywall ..................... 385/52 | GB | 2 266 385 A | 10/1993 |
| 6,359,333 B1 | 3/2002 | Wood et al. ................. 257/704 | GB | 2 296 152 A | 6/1996 |
| 6,384,959 B1 | 5/2002 | Furlani et al. .............. 359/291 | GB | 2 319 424 A | 5/1998 |
| 6,387,723 B1 | 5/2002 | Payne et al. ................... 438/48 | JP | 53-39068 | 4/1978 |
| 6,392,309 B1 | 5/2002 | Wataya et al. .............. 257/796 | JP | 55-111151 | 8/1980 |
| 6,396,789 B1 | 5/2002 | Guerra et al. ............... 369/112 | JP | 57-31166 | 2/1982 |
| 6,418,152 B1 | 7/2002 | Davis | JP | 57-210638 | 12/1982 |
| 6,421,179 B1 | 7/2002 | Gutin et al. ................. 359/372 | JP | 60-49638 | 3/1985 |
| 6,438,954 B1 | 8/2002 | Goetz et al. | JP | 60-94756 | 5/1985 |
| 6,445,502 B1 | 9/2002 | Islam et al. ................. 359/571 | JP | 60-250639 | 12/1985 |
| 6,452,260 B1 | 9/2002 | Corbin et al. .............. 257/686 | JP | 61-142750 | 6/1986 |
| 6,466,354 B1 | 10/2002 | Gudeman ................... 359/247 | JP | 61-145838 | 7/1986 |
| 6,479,811 B1 | 11/2002 | Kruschwitz et al. | JP | 63-234767 | 9/1988 |
| 6,480,634 B1 | 11/2002 | Corrigan ........................ 385/4 | JP | 63-305323 | 12/1988 |
| 6,497,490 B1 | 12/2002 | Miller et al. ................ 359/614 | JP | 1-155637 | 6/1989 |
| 6,525,863 B1 | 2/2003 | Riza ........................... 359/290 | JP | 40-1155637 | 6/1989 |
| 6,563,974 B1 | 5/2003 | Agha Riza ................... 385/18 | JP | 2219092 | 8/1990 |
| 6,565,222 B1 | 5/2003 | Ishii et al. .................. 359/883 | JP | 4-333015 | 11/1992 |
| 6,569,717 B1 | 5/2003 | Murade | JP | 7-281161 | 10/1995 |
| 2001/0019454 A1 | 9/2001 | Tadic-Galeb et al. ........ 359/649 | JP | 3288369 | 3/2002 |
| 2001/0026674 A1* | 10/2001 | Bishop et al. .............. 385/140 | WO | WO 90/13913 | 11/1990 |
| 2002/0015230 A1 | 2/2002 | Pilossof et al. ............. 359/558 | WO | WO 90/12506 | 7/1992 |
| 2002/0021485 A1 | 2/2002 | Pilossof ...................... 359/295 | WO | WO 93/02269 | 2/1993 |
| 2002/0079432 A1 | 6/2002 | Lee et al. ................... 250/216 | WO | WO 93/09472 | 5/1993 |
| 2002/0105725 A1 | 8/2002 | Sweatt et al. ............... 359/566 | WO | WO 93/18428 | 9/1993 |
| 2002/0112746 A1 | 8/2002 | DeYoung et al. ............. 134/36 | WO | WO 93/22694 | 11/1993 |
| 2002/0131228 A1 | 9/2002 | Potter | WO | WO 94/09473 | 4/1994 |
| 2002/0131230 A1 | 9/2002 | Potter .......................... 361/277 | WO | WO 94/29761 | 12/1994 |
| 2002/0135708 A1 | 9/2002 | Murden et al. | WO | WO 95/11473 | 4/1995 |
| 2002/0176151 A1 | 11/2002 | Moon et al. | WO | WO 96/02941 | 2/1996 |
| 2002/0195418 A1 | 12/2002 | Kowarz et al. | WO | WO 96/08031 | 3/1996 |
| 2002/0196492 A1 | 12/2002 | Trisnadi et al. | WO | WO 96/41217 | 12/1996 |
| 2003/0056078 A1 | 3/2003 | Johansson et al. | WO | WO 96/41224 | 12/1996 |
| 2003/0095737 A1* | 5/2003 | Welch et al. .................. 385/14 | WO | WO 97/22033 | 6/1997 |
| | | | WO | WO 97/26569 | 7/1997 |

FOREIGN PATENT DOCUMENTS

| | | | | | |
|---|---|---|---|---|---|
| DE | 43 23 799 A1 | 1/1994 | WO | WO 98/05935 | 2/1998 |
| DE | 197 23 618 A1 | 12/1997 | WO | WO 98/24240 | 6/1998 |
| DE | 197 51 716 | 5/1998 | WO | WO 98/41893 | 9/1998 |
| DE | 198 46 532 C1 | 5/2000 | WO | WO 99/07146 | 2/1999 |
| EP | 0 089 044 A2 | 9/1983 | WO | WO 99/12208 | 3/1999 |
| EP | 0 261 901 A2 | 3/1988 | WO | WO 99/23520 | 5/1999 |
| EP | 0 314 437 A1 | 10/1988 | WO | WO 99/34484 | 7/1999 |
| EP | 0 304 263 A2 | 2/1989 | WO | WO 99/59335 | 11/1999 |
| EP | 0 306 308 A2 | 3/1989 | WO | WO 99/63388 | 12/1999 |
| EP | 0 322 714 A2 | 7/1989 | WO | WO 99/67671 | 12/1999 |
| EP | 0 627 644 A3 | 9/1990 | WO | WO 00/04718 | 1/2000 |
| EP | 0 417 039 A1 | 3/1991 | WO | WO 00/07225 | 2/2000 |
| EP | 0 423 513 A2 | 4/1991 | WO | WO 01/04674 A1 | 1/2001 |
| EP | 0 436 738 A1 | 7/1991 | WO | WO 01/006297 A3 | 1/2001 |
| EP | 0 458 316 A2 | 11/1991 | WO | WO 01/57581 A3 | 8/2001 |
| EP | 0 477 566 A2 | 4/1992 | WO | WO 02/025348 A3 | 3/2002 |
| EP | 0 488 326 A3 | 6/1992 | WO | WO 02/31575 A2 | 4/2002 |
| EP | 0 499 566 A2 | 8/1992 | WO | WO 02/058111 A2 | 7/2002 |
| EP | 0 528 646 A1 | 2/1993 | WO | WO 02/065184 A3 | 8/2002 |
| EP | 0 530 760 A2 | 3/1993 | WO | WO 02/073286 A2 | 9/2002 |
| EP | 0 550 189 A1 | 7/1993 | WO | WO 02/084375 A1 | 10/2002 |
| EP | 0 610 665 A1 | 8/1994 | WO | WO 02/084397 A3 | 10/2002 |
| EP | 0 627 644 A2 | 12/1994 | WO | WO 03/001281 A1 | 1/2003 |
| EP | 0 627 850 A1 | 12/1994 | WO | WO 03/001716 A1 | 1/2003 |
| EP | 0 643 314 A2 | 3/1995 | WO | WO 03/012523 A1 | 2/2003 |
| EP | 0 654 777 A1 | 5/1995 | WO | WO 03/016965 A1 | 2/2003 |
| EP | 0 658 868 A1 | 6/1995 | WO | WO 03/023849 A1 | 3/2003 |
| EP | 0 658 830 A1 | 12/1995 | WO | WO 03/025628 A2 | 3/2003 |
| EP | 0 689 078 A1 | 12/1995 | | | |
| EP | 0 801 319 A1 | 10/1997 | | | |
| EP | 0 851 492 A2 | 7/1998 | | | |
| EP | 1 003 071 A2 | 5/2000 | | | |
| EP | 1 014 143 A1 | 6/2000 | | | |

OTHER PUBLICATIONS

Amm et al., *Invited Paper: Grating Light Valve™ Technology: Update and Novel Applications,* SID Digest, vol. 29, 1998.

"Development of Digital MEMS-Based Display Technology Promises Improved Resolution, Contrast, And Speed", XP-000730009, 1997, p. 33 of 34.

"Micromachined Opto/Electro/Mechanical Systems," Electronic Systems, NASA Tech Briefs, Mar. 1997, pp. 50 & 52.

David M. Burns et al., "Development of Microelectromechnical Variable Blaze Gratings," Sensors and Actuators A 64 (1998), pp. 7-15.

R. Apte, "Grating Light Valves for High Resolution Displays", Solid State Sensors and Actuators Workshop, Ph D. Dissertation, Stanford University (Jun. 1994).

O. Solgaard, "Integrated Semiconductor Light Modulators for Fiber-Optic and Display Applications", Ph.D. Dissertation, Stanford University Feb. 1992.

J. Neff, "Two-Dimensional Spatial Light Modulators: A Tutorial", Proceedings of the IEEE, vol. 78, No. 5 (May 1990), pp. 826-855.

R. Gerhard-Multhaupt, "Viscoelastic Spatial Light Modulators and Schlieren-Optical Systems for HDTV Projection Displays" SPIE vol. 1255 Large Screen Projection Displays II (1990), pp. 69-78.

R. Gerhard-Multhaupt, "Light-Valve Technologies for High-Definition Television Projection Displays", Displays vol. 12, No. 3/4 (1991), pp. 115-128.

O. Solgaard, F. Sandejas, and D. Bloom, "Deformable Grating Optical Modulator," Optics Letters, vol. 17, No. 9, May 1, 1992, New York, USA, pp. 688-690.

F. Sandejas, R. Apte, W. Banyai, and D. Bloom, "Surface Microfabrication of Deformable Grating Valve for High Resolution Displays," The 7$^{th}$ International Conference on Solid-State Sensors and Actuators.

P. Alvelda, "High-Efficiency Color Microdisplays," SID 95 Digest, pp. 307-311, 1995.

Worboys et al., "Miniature Display Technology for integrated Helmut Systems," GEC Journal of Research, vol. 10, No. 2, pp. 111-118, Chelmsford, Essex, GB 1993.

M. Farn et al., "Color Separation by use of Binary Optics," Optics Letters, vol. 18 :15 pp. 1214-1216, 1993.

P. Alvelda, "VLSI Microdisplays and Optoelectric Technology," MIT, pp. 1-93, 1995.

P. Alvelda, "VLSI Microdisplay Technology," Oct. 14, 1994.

D. Rowe, "Laser Beam Scanning," SPIE, vol. 2088, Oct. 5, 1993, 18-26.

L. Hornbeck, "Deformable-Mirror Spatial Light Modulators," Spatial Light Modulators and Application III, Aug. 8, CA 1989, pp. 86-102.

Russick et al., "Supercritical Carbon Dioxide Extraction of Solvent from Micromachined Structures," Supercritical Fluids, Chapter 18, American Chemical Society, pp. 255-269, 1997.

Buhler et al., "Linear Array of Complementary Metal Oxide Semiconductor Double-Pass Metal Micromirrors," Optical Engineering, vol. 36, No. 5, pp. 1391-1398, May 1997.

Gani et al., "Variable Gratings for Optical Switching: Rigorous Electromagnetic Simulation and Design," Optical Engineering, vol. 38, No. 3, pp. 552-557, Mar. 1999.

R. Tepe, et al. "Viscoelastic Spatial Light Modulator with Active Matrix Addressing," Applied Optics, vol. 28, No. 22, New York, USA, pp. 4826-4834, Nov. 15, 1989.

W. Brinker, et al., "Deformation Behavior of Thin Viscoelastic Layers Used in an Active-Matrix-Addressed Spatial Light Modulator," SPIE vol. 1018, pp. 79-85, Germany, 1988.

T. Utsunomiya and H. Sato, "Electrically Deformable Echellette Grating and its Application to Tunable Laser Resonator," Electronics and Communications in Japan, vol. 63-c, No. 10, pp. 94-100, Japan, 1980.

R.N. Thomas, et al., "The Mirror-Matrix Tube: A Novel Light Valve for Projection Displays", IEEE Transactions on Electron Devices, vol. ED-22, No. 9, pp. 765-775, Sep. 1975.

J. Guldberg, et al., "An Aluminum/SiO2/Silicon-on-Sapphire Light Valve Matrix for Projection Displays," Applied Physics Letters, vol. 26, No. 7, pp. 391-393, Apr. 1975.

"Kitchen Computer", IBM Technical Disclosure Bulletin, vol. 37, No. 12, pp. 223-225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long-Haul WDM Communication Systems" IEEE Photonics Technology Letters, vol. 9, No. 3, Mar. 1997, pp. 377 of 379.

N. J. Frigo et al., "A Wavelength-Division Multiplexed Passive Optical Network with Cost-Shared Components", IEEE Photonics Technology Letters, vol. 6, No. 11, Nov. 1994, pp. 1365 of 1367.

M. S. Goodman et al., "The LAMBDANET Multiwavelength Network: Architecture, Applications, and Demonstrations", IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum-Optical Components, Feb. 2001, pp. 1 of 10.

R. Plastow, "Tunable Lasers and Future Optical Networks", Forum-Tunable Laser, Aug. 2000, pp. 58 of 62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

S.T. Pai, et al., "Electromigration in Metals", Received Jun. 4, 1976, pp. 103-115.

Olga B. Spahn, et al., "High Optical Power Handling of Pop-Up Microelectromechanical Mirrors", Sandia National Laboratories, IEEE 2000, pp. 51-52.

David M. Burns, et al. "Optical Power Induced Damage to Microelectromechanical Mirrors", Sensors and Actuators A 70, 1998, pp.6-14.

V.S. Aliev et al., "Development of Si(100) surface roughness at the initial stage of etching in F2 and XeF2 gases: ellipsometric study," Surface Science 442 (1999), pp. 206-214.

Xuan-Qi Wang et al., "Gas-Phase Silicon Etching with Bromine Trifluoride," Depart of Electrical Engineering, 136-93 California Institute of Technology, 1997 IEEE, pp. 1505-1508.

Harold F. Winters, "Etch products from the reaction of XeF2 with SiO2, Si3N4, SiC, and Si in the presence of Ion Bombardment," IBM Research Laboratory, 1983 American Vacuum Society, pp. 927-931.

F.A. Houle, "Dynamics of SiF4 desorption during etching of silicon by XeF2," J. Chem. Phys. 87 (3), Aug. 1, 1987, pp. 1866-1872.

Mehran Mehregany, "Microelectromechanical Systems," 1993 IEEE, pp. 14-22.

D. Moser et al., "A CMOS Compatible Thermally Excited Silicon Oxide Beam Resonator with Aluminium Mirror," Physical Electronics Laboratory, 1991 IEEE, pp. 547-550.

M. Parameswaran et al., "Commerical CMOS Fabricated

Integrated Dynamic Thermal Scene Simulator," 1991 IEEE, pp. 29.4.1-29.4.4.

M. Parameswaran et al., "CMOS Electrothermal Microactuators," Depart of Electrical Engineering, 1990 IEEE, pp. 128-131.

U. Streller et al., "Selectivity in dry etching of Si(100) with XeF2 and VUV light," Applied Surface Science 106, (1996), pp. 341-346.

M.J.M Vugts et al., "Si/XeF2 etching: Temperature dependence,"1996 American Vacuum Society, pp. 2766-2774.

P. Krummenacher et al., "Smart Temperature Sensor in CMOS Technology," Sensors and Actuators, A-21-A23 (1990), pp. 636-638.

Henry Baltes, "CMOS as sensor technology," Sensors and Actuators A. 37-38, (1993), pp. 51-56.

Thomas Boltshauser et al., "Piezoresistive Membrane Hygrometers Based on IC Technology," Sensor and Materials, 5, 3, (1993), pp. 125-134.

Z. Parpia et al., "Modelling of CMOS Compatible High Voltage Device Structures," pp. 41-50.

Jon Gildemeister, "Xenon Difluoride Etching Systems," 1997, UC Berkeley MicroTabrication Manual Chapter 7.15, pp. 2-5.

W. Riethrmuller et al., "A smart accelerometer with on-chip electronics fabricated by a commercial CMOS process," Sensors and Actuators A. 31, (1992), 121-124.

W. Gopel et al., "Sensors- A Comprehensive Survey," vol. 7, Weinheim New York, 44 pgs.

D. E. Ibbotson et al., "Comparison of XeF2 and F-atom reations with Si and SiO2," 1984 American Institute of Physics, pp. 1129-1131.

D. E. Ibbotson et al., "Plasmoless dry etching of silicon with fluorine-containing compounds," 1984 American Institute of Physics, pp. 2939-2942.

M.H. Hecht et al., "A novel x-ray photoelectron spectroscopy study of the Al/SiO2 interfaces," 1985 American Institute of Physics, pp. 5256-52616.

Daniel L. Flamm et al., "XeF2 and F-Atom Reactions with Si: Their Significance for Plasma Etching.," Solid State Technology, vol. 26, #4, 4/83, pp. 117-121.

H.F. Winters et al., "The etching of silicon with XeF2 vapor," Appl. Phys. Lett. vol. 34, No. 1, Jan. 1979, pp. 70-73.

Wayne Bailey et al., "Microelectronic Structures and Microelectromechanical Devices for Optical Processing and Multimedia Applications," SPIE — The International Society for Optical Engineering, vol. 2641, Oct. 1995, 13 pgs.

J. Marshall et al., "Realizing Suspended Structures on Chips Fabricated by CMOS Foundry Processes Through the MOSIS Service, " National Inst. of Standards and Technology, Jun. 1994, 63 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison-Wesley, $2^{nd}$ edition, 1987, Adelphi University, pp. 163-169.

E. Hecht, "Optics", Addison-Wesley, $2^{nd}$ edition, 1987, Adelphi University, pp. 358-360.

T. Glaser et al., "Beam switching with binary single-order diffractive grating", XP-000802142, Optics Letters, Dec. 15, 1998, vol. 23, No. 24, pp. 1933 of 1935.

P. C. Kundu et al., "Reduction of Speckle Noise by Varying the Polarisation of Illuminating Beam", XP-002183475, Dept. of Applied Physics, Calcutta University, 1975, pp. 63-67.

J. W. Goodman, "Some Fundamental Properties of Speckle", XP-002181682, Dept. of Electrical Engineering, Stanford University, 1976, pp. 1146-1150.

Lingli Wang et al., "Speckle Reduction in Laser Projection Systems by Diffractive Optical Elements", XP-000754330, Applied Optics, Apr. 1, 1998, vol. 37 No. 10, pp. 1770-1775.

R.W. Corrigan et al., "Calibration of a Scanned Linear Grating Light-Valve, Projection System for E.Cinema Applications", Silicon Light Machines, SID'99, San Jose, CA, 27 pgs, 1999.

R.W. Corrigan et al., "Calibration of a Scanned Linear Grating Light-Valve, Projection System", Silicon Light Machines, San Jose, CA, 4 pgs, May 18, 1999.

"Introduction to Cryptography", http://www.ssh.fi/tech/crpto/into.html. 35 pgs, Jun. 21, 1999.

"Deep Sky Black," Equinox Interscience, www.cisci.com/deepsky.html. 1997.

"Absorptive Neutral density Filters," Newport Corp., Irvine, CA, www.newport.com, May 7, 1999.

"High Energy Variable Attenuators," Newport Corp., Irvine, CA, www.newport.com, May 7, 1999.

"Neutral-Density Filters," New Focus, Inc., Santa Clara, CA, www.newfocus.com, May 7, 1999.

J. Hawkes et al., "Laser Theory and Practice," Prentice Hall, New York, 1995, pp. 407-408.

C. Tew et al., "Electronic Control of a Digital Micromirror Device for Projection Displays", Proceedings of the 1994 IEEE International Solid-State Circuits Conference, 1994.

Henck, S.A., "Lubrication of Digital Mircomirror Devices™", Tribology Letters, No. 3, pp. 239-247, 1997.

K. W. Goossen et al., "Silicon Modulator Based on Mechanically-Active Anti-Reflection Layer with 1 Mbit/sec Capability for Fiber-in-the-Loop Applications", IEEE Protonics Technology Letters, vol. 6, No. 9, Sep. 1994, pp. 1119-1121.

J. A. Walker et al., "Demonstration of a Gain Flattened Optical Amplifier with Micromechanical Equalizer Element", Lucent Technologies, pp. 13-14.

A. P. Payne et al., "Resonance Measurements of Stresses in $Al/Si_3N_4$ Micro-Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault-Tolerant Multiwavelength Programmable Fiber-Optic Attenuator Using a Two-Dimensional Digital Micromirror Device", Optics Letters, Mar. 1, 1999, vol. 24, No. 5, pp. 282-284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309-2318.

P. Alvelda et al., "44.4: Ferroelectric Microdisplays Using Distortion-Compensated Pixel Layouts", SID 95 Digest, XP 2020715, pp. 931-933.

* cited by examiner

DIFFRACTIVE LIGHT MODULATOR-BASED DYNAMIC EQUALIZER WITH INTEGRATED SPECTRAL MONITOR

FIELD OF THE INVENTION

The present invention relates to the field of signal equalization within wavelength division multiplexed optical transmission networks. More particularly, the present invention relates to the use of diffractive light modulators for signal equalization of component signals within wavelength division multiplexed optical fiber networks.

BACKGROUND OF THE INVENTION

Analog and digital communication have long used frequency/wavelength multiplexing as one means of achieving greater bandwidth. Through multiplexing, discrete signals defined by distinct wavelengths are transmitted across the same medium. Each discrete signal is typically assigned to carry specific information. Signal attenuation within a fiber network, however, is oftentimes frequency or wavelength dependent. Accordingly, the rate of attenuation, commonly measured in dB/km can vary among different wavelengths within a fixed optical spectrum. Consequently, the wavelength distinguished by the highest rate of attenuation will typically govern fundamental network parameters such as the maximum distance between repeaters. One result of differing rates of attenuation, therefore, is that different wavelengths transmitted at a same power will be at different power levels upon reaching a repeater or other processing station. In addition, the routing and switching of signals within a metropolitan network has the capacity to combine signals of disparate power levels. Moreover, there is unevenness in the multiplexing and demultiplexing components, unequal gain over different wavelengths in erbium doped fiber amplifiers (EDFAs), unequal laser launch power for the different channels, etc. All of these features exacerbate the uneven power levels of different wavelengths during the transmission, re-transmission, routing and processing of an optical signal.

FIG. 1 illustrates a spectrum made up of many discrete wavelengths, from a first wavelength $\lambda_1$ up to an $n^{th}$ wavelength $\lambda_n$, which form component signals within a collective wavelength multiplexed signal within an optical medium. The Y-axis represents signal power, and the X-axis represents a spectrum of wavelengths. The lower signal threshold 124 is the lowest signal power level to which a signal may attenuate and remain reliably processable according to system requirements. The "saturation threshold" 120 is the maximum allowable signal power of the network for any one wavelength. Between these two levels, a reference power level 122 is illustrated throughout FIGS. 1, 2 and 4 for comparative purposes only. For illustrative purposes, it is assumed that all of the component wavelengths or frequencies depicted in FIG. 1 began at equal signal strength, and have attenuated to the levels seen in FIG. 1 during launch, transmission, routing or other processing within a fiber optical network. As seen in FIG. 1, the signals can be at different strengths. The third wavelength $\lambda_3$ is seen to be quite robust, remaining above the reference level 122. Whereas, the fourth wavelength $\lambda_4$ is seen to have attenuated to a signal strength substantially below the reference level 122.

FIGS. 2 and 3 show the signals of FIG. 1 after each component wavelength has been uniformly amplified. Because the third wavelength $\lambda_3$ was the strongest signal prior to amplification, it remains the strongest signal after amplification. Plotting uniformly amplified signals, the relationship in signal strength is therefore unchanged from the pre-amplification relationship of FIG. 1, provided all of the component signals remain below the saturation threshold. FIG. 2 shows all component signals within the upper limit of the network parameters, with the strongest signal, the third wavelength, $\lambda_3$, at the upper limit. As noted however, the other discrete wavelengths fall far below the upper threshold. Because it was earlier determined that the fourth wavelength $\lambda_4$ was subject to the greatest attenuation during transmission, future transmission subsequent FIG. 2 is limited by the fourth wavelength $\lambda_4$, which is both the weakest signal, and subject to the greatest attenuation. Failure to amplify the fourth wavelength $\lambda_4$ to the maximum allowable signal strength 120 will result in attenuation of $\lambda_4$ to the lower threshold 124 in a substantially shorter transmission distance than if it had begun at the upper threshold 120. Alternatively, FIG. 3 shows the fourth $\lambda_4$, which is the weakest component wavelength in the figure, amplified to the upper threshold 120. The problem with this approach, however, becomes clear when an examination is made of the other component signals in FIG. 3. By amplifying the weakest signal up to the upper threshold 120 of the network, in a uniform amplification process, all other signals, $\lambda_1$, $\lambda_2$, $\lambda_3$, $\lambda_n$ are amplified above the upper threshold 120 of the optical network.

To optimize network performance therefore, a first step in the processing of a wavelength multiplexed signal is channel equalization of component signals $\lambda_1, \ldots, \lambda_n$. FIG. 4 illustrates component signals in a wavelength multiplexed signal which have been both equalized, and amplified to the upper threshold 120 of the network parameters. Unless the weakest component signals $\lambda_1, \ldots, \lambda_n$ is below the allowable threshold for maintaining an acceptable signal to noise ratio, the first step of the equalization process is to reduce the signal strength of each component wavelengths component signals $\lambda_1, \ldots, \lambda_n$ to the level of the lowest power of any of the signals present. Alternatively, the component signals may be reduced to a common predetermined power level. The second step in the equalization process is to uniformly amplify the equalized component signals $\lambda_1, \ldots, \lambda_n$ to a predetermined power level, preferably the maximum recommended power level 120 (FIG. 4) of a network. By this process of equalization and amplification, all wavelengths within a signal can be equally amplified to the maximum power allowable on a fiber network, thereby maximizing the signal to noise ratio and minimizing the bit error rate. Equalization is used in this context to indicate that all signals have been attenuated to an equal level. Equalization is also used in a more general sense to refer to any desired attenuation level, which can vary from wavelength to wavelength.

U.S. application Ser. No. 10/051,972 filed on Jan. 15, 2002, and entitled "METHOD AND APPARATUS FOR DYNAMIC EQUALIZATION IN WAVELENGTH DIVISION MULTIPLEXING" teaches a channel equalizer in which a grating light valve™ light modulator array is used for dynamic signal equalization of component wavelengths within a wavelength division multiplexed (WDM) optical fiber network. The WDM signal is de-multiplexed into its component wavelengths. The component wavelengths are appropriately directed such that each component wavelength impinges a grating light valve™ light modulator of the grating light valve™ light modulator array. The grating light valve™ light modulator array equalizes each component wavelength. The equalized component wavelengths are re-multiplexed and output as an equalized WDM output signal via an output fiber.

The Ser. No. 10/051,972 application teaches a separate detecting system that monitors the power levels of each equalized component wavelength. A coupler, or fiber tap, is positioned to divert a portion of the equalized WDM output signal to an optical performance monitor in order to measure the power levels associated with each equalized component wavelength. The measured power levels are provided as feedback to a controller, which in turn adjusts the grating light valve™ light modulator array until equalization is reached. According to this approach, a separate de-multiplexer would be required to de-multiplex the diverted signal to measure the strength of the component wavelengths making up the diverted portion of the equalized WDM output signal. This approach suffers from the obvious need for redundant de-multiplexor/multiplexor and imaging lenses, and is therefore inefficient and costly.

The Ser. No. 10/051,972 application further describes an alternative embodiment in which separate couplers and light sensors are integral to the channel equalizer of the Ser. No. 10/051,972 application. This approach requires that each component wavelength be directed by a waveguide, and that a coupler and a sensor are attached to each waveguide.

There exists therefore a need for a method and apparatus for efficiently and economically measuring the power levels on the individual equalized wavelength channels. There is also a need for a method and apparatus for measuring the power levels on the individual equalized wavelength channels without coupling to each individual fiber transmitting a de-multiplexed wavelength channel. There further exists a need for a method and apparatus for measuring the power levels on the individual equalized wavelength channels without coupling to a single fiber transmitting multiplexed equalized wavelength channels that require de-multiplexing prior to measuring.

SUMMARY OF THE INVENTION

An integrated device of the present invention comprises free-space optics, a bi-directional multiplexor/de-multiplexor, a diffractive light modulator, a beam splitter, a photo diode array (PDA) optical monitor, and a controller. The free-space optics collimate, transform and image optical signals including a range of component wavelength signals. The bi-directional multiplexor/de-multiplexor de-multiplexes a wavelength division multiplexed signal into the component wavelength signals and multiplexes equalized component wavelength signals into an equalized wavelength division multiplexed signal. The diffractive light modulator selectively equalizes each component wavelength signal. The beam splitter is optically coupled in free-space to the diffractive light modulator for receiving the equalized component wavelength signals and re-directing a representative portion of each of the equalized component wavelength signals. The PDA optical monitor receives and detects relative power levels of each representative portion of the equalized component wavelength signals. The controller receives the detected power levels from the optical performance monitor and dynamically modulates the diffractive light modulator in response to the detected power levels to maintain a desired level of each of the equalized component wavelength signals.

The diffractive light modulator comprises pixels configured to receive the component wavelength signals from the de-multiplexor, wherein each pixel is controllable to selectively direct a received signal in a first mode and a second mode, thereby forming the equalized component wavelength signals.

DETAILED DESCRIPTION OF THE EMBODIMENTS

U.S. Pat. Nos. 5,311,360 entitled "METHOD AND APPARATUS FOR MODULATING A LIGHT BEAM" and 5,841,579 entitled "FLAT DIFFRACTION GRATING LIGHT VALVE to Bloom et al. and U.S. Pat. No. 5,661,592 entitled "METHOD OF MAKING AN APPARATUS FOR A FLAT DIFFRACTION GRATING LIGHT VALVE" to Bornstein et al., are herein incorporated by reference. U.S. application Ser. No. 10/051,972 filed on Jan. 15, 2002, and entitled "METHOD AND APPARATUS FOR DYNAMIC EQUALIZATION IN WAVELENGTH DIVISION MULTIPLEXING" is herein incorporated by reference.

The present invention overcomes deficiencies of conventional approaches by combining a diffractive light modulator-based dynamic equalizer and an optical performance monitor within a single integrated device. Using free-space optics, a wavelength division multiplexed (WDM) signal is de-multiplexed into its component wavelengths and each wavelength is directed to a designated position on a grating light valve™ light modulator array. Controlling electronics instruct the grating light valve™ light modulator array to dynamically equalize the respective wavelengths which are then re-multiplexed. A beam-splitter is introduced to direct a portion of the equalized, yet still de-multiplexed, wavelengths to a photo-diode array (PDA), which performs the function of an optical performance monitor. Power levels for each wavelength are measured by the PDA and sent to the grating light valve™ light modulator controlling electronics. In this manner, a highly accurate closed loop dynamic equalization can be achieved within a single optical module. Considering that a dynamic equalizer and an optical performance monitor share the same front-end sub-system, the additional cost and space of an integrated system is typically much less compared to the common practice where the dynamic equalizer and the optical performance monitor are two separate optical modules. With proper calibration, the PDA can measure signal-to-noise ratio and other critical performance parameters of the WDM signal.

It is understood that free-space optics refers to discrete optical elements propagating light through free-space. This contrasts the case where light is propagated through waveguides.

Figure 1:
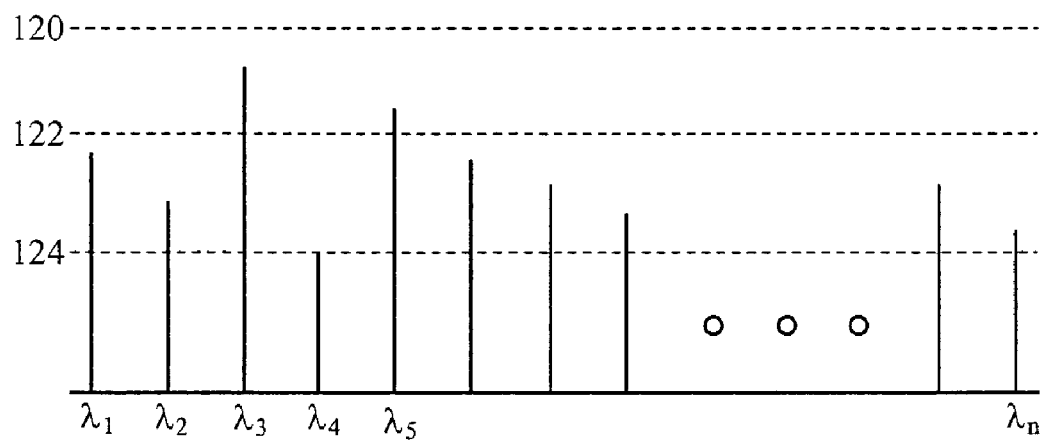
FIG. 1 graphically illustrates an exemplary wavelength multiplexed signal with component wavelengths at different power levels as a result of attenuation during transmission.
Figure 2:
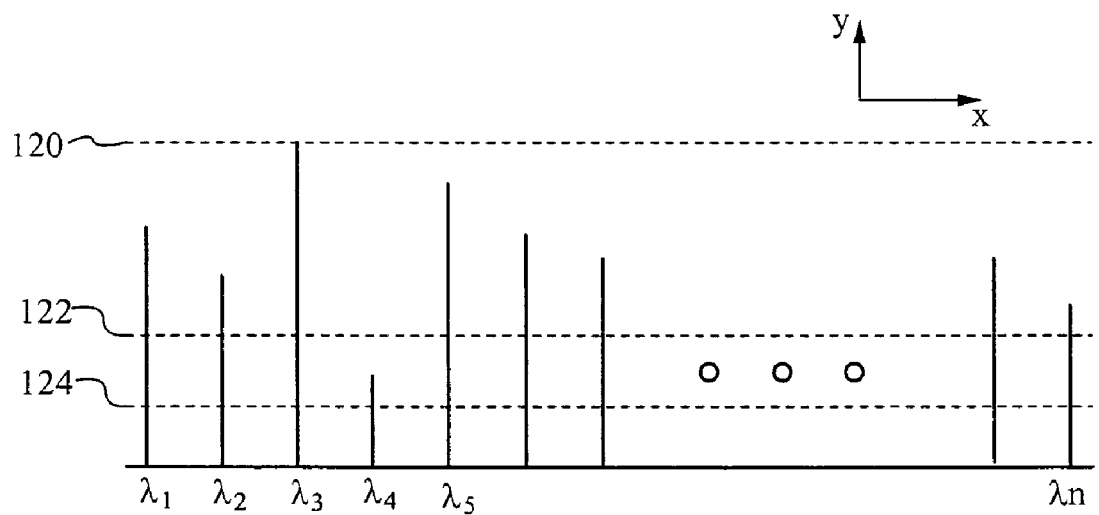
FIG. 2 graphically illustrates the signal of FIG. 1 after the component wavelengths have been uniformly amplified, wherein the strongest signal has been amplified to the saturation threshold.
Figure 3:
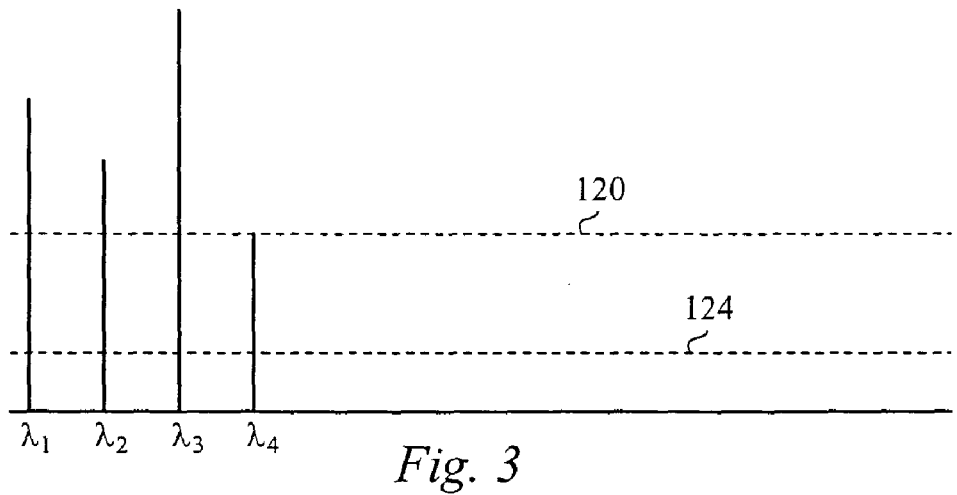
FIG. 3 graphically illustrates the signal of FIG. 1 after the component wavelengths have been uniformly amplified, wherein the weakest signal has been amplified to the saturation threshold.
Figure 4:
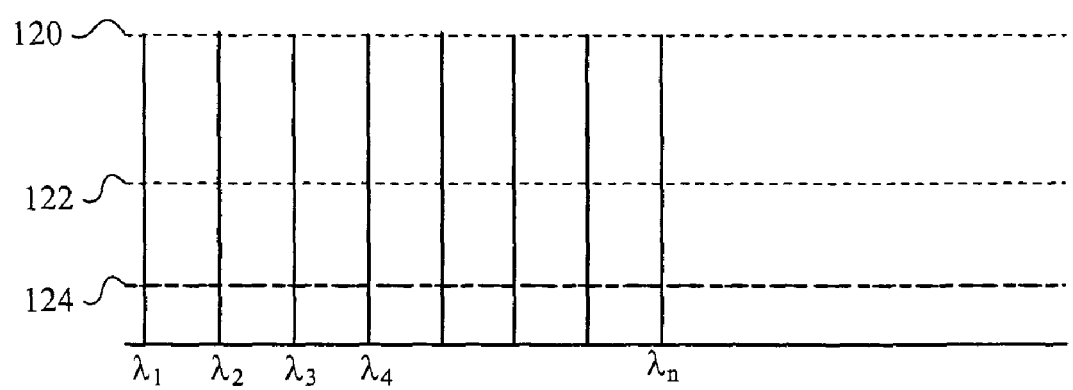
FIG. 4 graphically illustrates the signal of FIG. 1 after the component wavelengths have been equalized to the same power.
Figure 5:
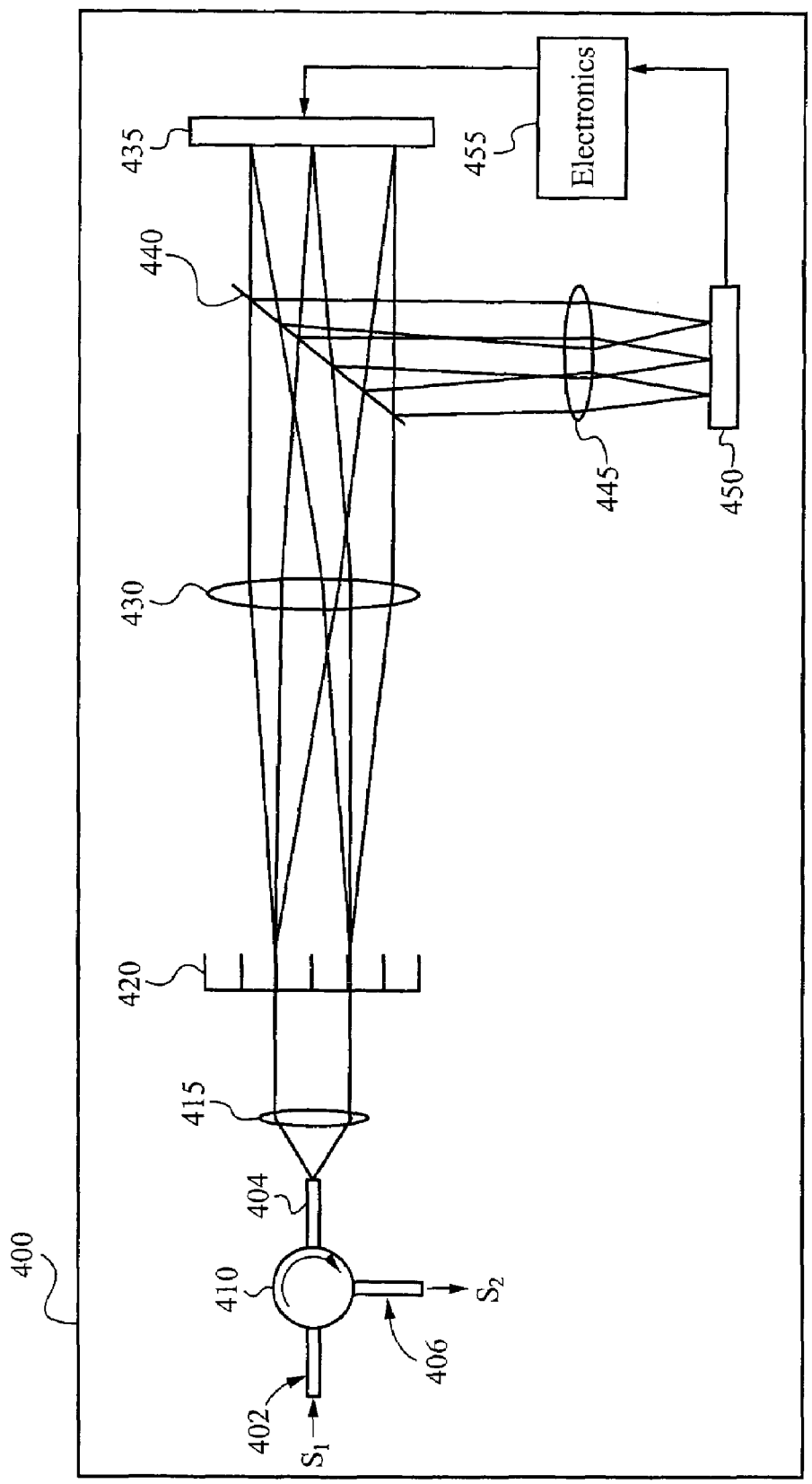
FIG. 5 illustrates an integrated dynamic equalizer and optical performance monitor according to the present invention.

FIG. 5 illustrates an integrated dynamic equalizer and optical performance monitor according to the preferred embodiment of the present invention. A WDM signal S1 entering port 402 of a circulator 410 is output at port 404 to a collimating lens 415. As illustrated in FIG. 5, it should be clear that from the point where signal S1 is output from port 404, the signal S1 is transmitted using free-space optics. The collimated signal S1 is transmitted to a bi-directional diffraction grating 420, where component wavelengths $\lambda_1, \ldots, \lambda_n$ are diffracted at different angles. Although a diffractive grating is preferably used to de-multiplex the signal S1 into component wavelengths $\lambda_1, \ldots, \lambda_n$, alternative means can be used, including but not limited to a prism and a, array waveguide (AWG) bi-directional de-multiplexor A transform lens 430 maps the component wavelengths $\lambda_1, \ldots, \lambda_n$ onto different positions of a diffractive light modulator 435. Preferably the diffractive light modulator 435 is a grating light valve™ light modulator array onto which each component wavelengths $\lambda_1, \ldots, \lambda_n$ is mapped to a particular grating light valve™ light modulator within the grating light valve™ light modulator array. The diffractive light modulator 435 is an addressable dynamic diffraction grating array. By adjusting the amount of diffraction, the reflected power can be controlled accurately over a large dynamic range.

Figure 6A:
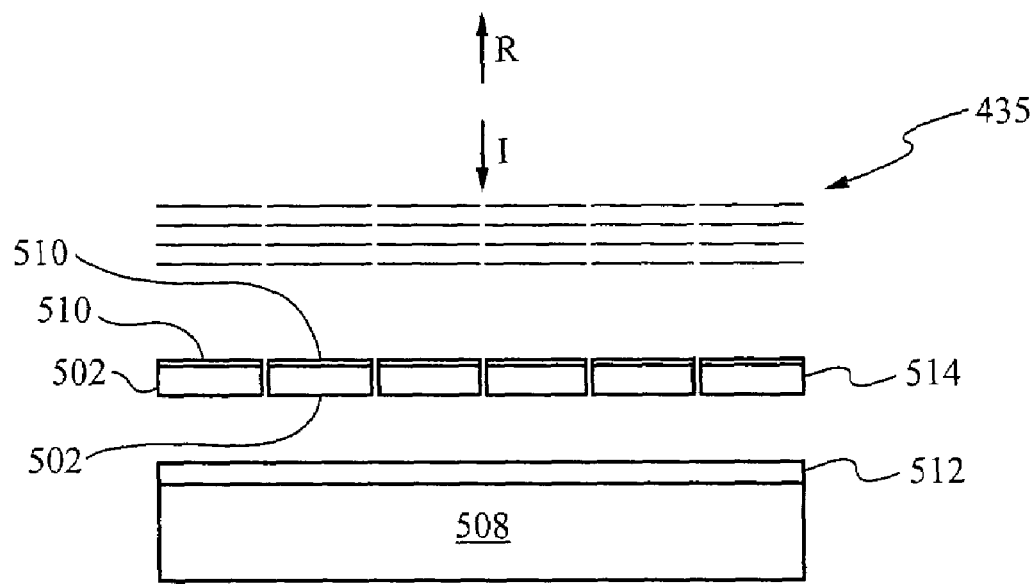
FIG. 6A illustrates the grating light valve™ light modulator of the preferred integrated apparatus of the present invention in a reflection mode.
Figure 6B:
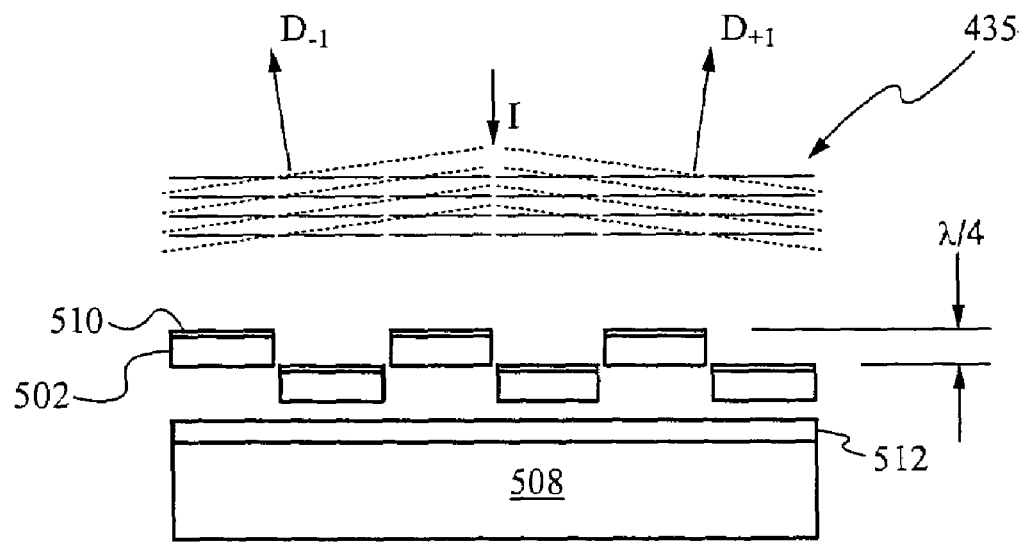
FIG. 6B illustrates the grating light valve™ light modulator of the preferred integrated apparatus of the present invention in a diffraction mode.

FIGS. 6A and 6B illustrate a grating light valve™ light modulator of the preferred integrated device of the present invention in a reflection mode and a diffraction mode, respectively. The grating light valve™ light modulator 435 preferably comprises elongated elements 502 suspended above a substrate 508 by a support structure (not shown). The elongated elements 502 comprise a conducting and reflecting surface 510. The substrate 508 comprises a conductor 512. In operation, the grating light valve™ light modulator 435 operates to produce modulated light selected from a reflection mode and a diffraction mode. The elongated elements 502 comprise the conducting and reflecting surface 510 and a resilient material 514.

It will be readily apparent to one skilled in the art that the conducting and reflecting surface 510 can be replaced by a multilayer dielectric reflector in which case a conducting element would also be included in each of the elongated elements 502. Further, it will be readily apparent to one skilled in the art that the conducting and reflecting surface 510 can be coated with a transparent layer such as an anti-reflective layer.

FIG. 6A depicts the grating light valve™ light modulator 435 in the reflection mode. In the reflection mode, the conducting and reflecting surfaces 510 of the elongated elements 502 form a plane so that incident light I reflects from the elongated elements 502 to produce reflected light R.

FIG. 6B depicts the grating light valve™ light modulator 435 in the diffraction mode. In the diffraction mode, an electrical bias causes alternate ones of the elongated elements 502 to move toward the substrate 508. The electrical bias is applied between the reflecting and conducting surfaces 510 of the alternate ones of the elongated elements 502 and the conductor 512. The electrical bias results in a height difference between the alternate ones of the elongated elements 502 and non-biased ones of the elongated elements 502. A height difference of a quarter wavelength $\lambda/4$ the incident light I produces maximum diffracted light including plus one and minus one diffraction orders, $D_{+1}$ and $D_{-1}$.

FIGS. 6A and 6B depict the grating light valve™ light modulator 435 in the reflection and diffraction modes, respectively. For a deflection of the alternate ones of the elongated elements 502 of less than a quarter wavelength $\lambda/4$, the incident light I both reflects and diffracts producing the reflected light R and the diffracted light including the plus one and minus one diffraction orders, $D_{+1}$ and $D_{-1}$. In other words, by deflecting the alternate ones of the elongated elements less the quarter wavelength $\lambda/4$, the grating light valve™ light modulator 435 produces a variable reflectivity. By varying the reflectivity in this manner, each wavelength can be equalized as desired. It should be born in mind that terms like "equalize" and "equalization" as used with respect to the present invention are to be broadly interpreted with respect to regulating the power levels of component light signals to any pre-determined level of relative power levels. Accordingly, the term "equalize" as used herein is not to be limited to any one particular curve or ratio, but simply constitutes a regulation or normalization of signal power against any pre-determined curve or ratio of power levels at different frequencies.

The elongated elements 502 are able to function as groups, which are referred to as pixels. Preferably, the pixels are groups of six of the elongated elements 502. Alternatively, the pixels are groups of more or less elongated elements 502. While FIGS. 6A and 6B depict the grating light valve™ light modulator 435 having six of the elongated elements 502, the grating light valve™ light modulator 435 preferably includes more than six of the elongated elements 502.

It will be readily apparent to one skilled in the art that the term "pixel" is used here in the context of an element of a light modulator rather than its more specific definition of a picture element of a display.

Referring back to FIG. 5, as each component wavelengths $\lambda_1, \ldots, \lambda_n$ interact with the diffractive light modulator 435, they experience diffraction. A benefit of diffraction is that a certain amount of light is "thrown away" from the central path, which is the very means by which the present invention controls the amount of light re-entering the port 404. In this manner, the light mapped onto the diffractive light modulator 435 is effected by the performance of the diffractive light modulator 435. As each wavelengths $\lambda_1, \ldots, \lambda_n$ impinges the diffractive light modulator 435, the grating light valve™ light modulator corresponding to each particular wavelength causes all, some, or none of the impinging light to diffract. In essence, each component wavelengths $\lambda_1, \ldots, \lambda_n$ is equalized by discarding all, some, or none of the signal by diffraction. As the elongated elements 502 of a grating light valve™ light modulator are deflected, the light mapped to that grating light valve™ light modulator is diffracted by an amount corresponding to the distance that the elongated elements are deflected, resulting in only a portion of the component wavelength being reflected. Through this process, each reflected component wavelength is equalized. The component wavelengths $\lambda_1, \ldots, \lambda_n$ are attenuated in this manner to form equalized component wavelengths $\lambda_1', \ldots, \lambda_n'$. When the elongated elements 502 are not deflected, none of the impinging light is diffracted and the entire component wavelength is reflected. It should be understood that the attenuation of the component wavelengths $\lambda_1, \ldots, \lambda_n$ to the equalized component wavelengths $\lambda_1', \ldots, \lambda_n'$ represents a change in power of each component wavelength, not an actually change of the wavelength.

The attenuating function of the grating light valve™ light modulator array can have any arbitrary shape along the array. The attenuating function can be a smoothly varying arbitrary shape, a pass-band filter for one or more channels, or any other desired function.

The equalized component wavelengths $\lambda_1', \ldots, \lambda_n'$ re-trace the same path through the transform lens 430 to the diffraction grating 420. The equalized component wavelengths $\lambda_1', \ldots, \lambda_n'$ are re-multiplexed by the diffractive grating 420 to form an output signal S2. The signal. S2 is focused through the collimating lens 415, back into the port 404. As seen in FIG. 5, by using a single port 404 to launch the input signal S1 and the collection of the output signal S2, a circulator 410 is required. The circulator 410 receives the input signal S1 from an incoming channel 402 and directs the output signal S2 through a separate output channel 406.

A beam splitter 440 is positioned to intersect the equalized component wavelengths $\lambda_1', \ldots, \lambda_n'$ before they are re-multiplexed. Preferably, the beam splitter 440 is placed between the transform lens 430 and the diffractive light modulator 435. Alternatively, the beam splitter 440 can be placed between the diffractive grating 420 and the transform lens 430. The beam splitter 440 is a low-level beam splitter on the order of 0.1%. The beam splitter 440 re-directs a portion of the equalized component wavelengths $\lambda_1', \ldots, \lambda_n'$ to an imaging lens 445. The imaging lens 445 focuses the portion of each equalized component wavelengths $\lambda_1', \ldots, \lambda_n'$ onto a photo diode array (PDA) 450. In other words, the beam splitter re-directs a small fraction of the specularly reflected light from the diffractive light modulator 435 towards the PDA 450.

The imaging lens 445 provides an imaging relationship such that each photo diode of the PDA 450 corresponds to the appropriate grating light valve™ light modulator in the grating light valve™ light modulator array 435. This relationship ensures that light intensity measured by a particular photo diode of a particular equalized component wavelengths $\lambda_1', \ldots, \lambda_n'$, say $\lambda_1'$, corresponds to the grating light valve™ light modulator that attenuated the same equalized component wavelength $\lambda_1'$. In this manner, light intensities as measured by the PDA 450 can be used as feedback to the diffractive light modulator 435 for dynamic equalization.

The portion of each of the equalized component wavelengths $\lambda_1', \ldots, \lambda_n'$ maps to a particular location on the PDA 450. The PDA 450 measures the light intensity of each portion of the equalized component wavelengths $\lambda_1', \ldots, \lambda_n'$ to determine the power levels of each of equalized component wavelengths $\lambda_1', \ldots, \lambda_n'$. These measurements are transmitted to the diffractive light modulator control electronics 455. The control electronics 455 provides control instructions to the diffractive light modulator 435. The control instructions dictate if, and by how much, the elongated elements 502 in each of the grating light valve™ light modulators are deflected. Therefore, not only can the component wavelengths $\lambda_1, \ldots, \lambda_n$ be equalized, but quality and accuracy of the equalization can be measured and adjusted. The PDA 450 provides the necessary feedback to the control electronics 455 to enable the diffractive light modulator 435 to accurately and dynamically equalize the component wavelengths $\lambda_1, \ldots, \lambda_n$. This feedback process occurs within a single integrated apparatus. According to the present invention, the integrated apparatus includes the free-space optics, the diffractive light modulator, the photo diode array and the control electronics.

Within the integrated apparatus of the present invention it is important that the equalized component signals are accessed and that they are accessed in a de-multiplexed state. It is also important to establish a well defined relationship between the positions on the grating light valve™ light modulator array, say for $\lambda_1$, and the corresponding position on the PDA, say for the equalized $\lambda_1$ from the grating light valve™ light modulator. With this proper relationship, the measured intensity on the PDA will correspond to the power level of the appropriate component wavelength. The control electronics control the distance that the elongated elements on the grating light valve™ light modulator are deflected to reach the desired power level for that particular component wavelength.

Before initial use, the PDA is calibrated to ensure that each equalized component wavelengths $\lambda_1', \ldots, \lambda_n'$ impinges the PDA at the proper location and that the light intensity is accurately measured. In this manner, each location, or photo diode, of the PDA indicates the wavelength of the channel and the power level of that channel. During calibration, these measured power levels are matched against predetermined values provided by the control electronics. Calibration ensures that the power versus wavelength spectrum as monitored by the PDA is equivalent to the actual power versus wavelength spectrum of the equalized component wavelengths $\lambda_1', \ldots, \lambda_n'$ of the output signal S2.

As previously discussed, conventional systems require separate modules to perform the functionality performed by the present invention. A first module performs the dynamic equalization and a second module performs the optical performance monitoring. In a conventional system, a portion of a multiplexed equalized signal must be siphoned-off from an output fiber of the dynamic equalization module. Typically this is performed using a fiber-tap. The siphoned signal is directed through another fiber to the optical performance monitor. Within the optical performance monitor, the multiplexed equalized signal must be de-multiplexed and directed to a PDA. In this conventional case, there is a great deal of redundancy between the dynamic equalizer and the optical performance monitor. Each must include a diffractive grating, or some other means of de-multiplexing, and an imaging lens to direct the multiplexed equalized signal to the diffractive grating. Such redundancy is costly and consumes space. The present invention essentially eliminates the redundancy of the conventional system by taking advantage of the free-space optics and the smooth mapping of the equalized component wavelengths onto the PDA. In addition to the redundancy of such a two module system, an additional interface is also required between the dynamic gain equalizer module and the optical performance monitor module. By integrating the two modules into a single integrated apparatus, the present invention eliminates the need for this additional interface.

The present invention uses free-space optics to smoothly de-multiplex a multiplexed component wavelength signal. The de-multiplexed component wavelengths are directed to a diffractive light modulator for equalization. A portion of the equalized component wavelengths are re-directed to a calibrated array detector. Power levels of each of the equalized component wavelengths are monitored and sent to control electronics. The control electronics use this feedback to instruct the diffractive light modulator. Such a feedback loop enables dynamic equalization of component wavelengths using free-space optics within a single integrated apparatus. Utilizing the PDA within the integrated apparatus provides the functionality of a conventional optical performance monitor without the inefficient duplication of a similar device somewhere downstream in the network. The integrated apparatus of the present invention also provides qualitative advantages over the conventional two module system by eliminating the need to include a fiber tap and to again de-multiplex within the optical performance monitor.

The present invention has been described in terms of specific embodiments incorporating details to facilitate the understanding of the principles of construction and operation of the invention. Such reference herein to specific embodiments and details thereof is not intended to limit the scope of the claims appended hereto. More specifically, references to the pick-up beam splitter for optically coupling the diffractive light modulator and the optical performance monitor is not intended to limit the manner in which the integration of the diffractive light modulator and the optical performance monitor is performed. It will be apparent to those skilled in the art that virtually any beam splitter type method may be adapted for optically coupling the diffractive light modulator and the optical performance monitor according to the present invention. Additionally, although the transform lens 430 and the imaging lens 445 are each depicted as being a single lens, it should be clear to those skilled in the art that either or both of the lenses 430 and 445 can be replaced by a plurality of lens for accomplishing the same functionality.

What is claimed is:

1. An integrated apparatus for selectively adjusting power levels of component signals of a wavelength division multiplexed signal, the apparatus comprising:
   a. a diffractive light modulator configured to receive de-multiplexed component signals and to selectively direct each of the received component signals into a first mode and a second mode, thereby forming equalized component signals; and
   b. an optical array detector optically coupled to the diffractive light modulator for collecting a representative portion of each of the equalized component signals and for detecting relative power levels associated with each collected representative portion, wherein the power levels are detected for dynamically configuring the diffractive light modulator to maintain a desired level of power in the first mode for each equalized component signal relative to each other,
   whereby the diffractive light modulator and the optical array detector are integrally coupled to form the integrated apparatus.

2. The apparatus according to claim 1 wherein the diffractive light modulator and the optical array detector are integrally coupled using free-space optics.

3. The apparatus according to claim 1 further comprising a controller electrically coupled to the optical array detector and the diffractive light modulator for receiving the detected power levels and sending control signals for dynamically configuring the diffractive light modulator.

4. The apparatus according to claim 1 further comprising a demultiplexer configured to de-multiplex the wavelength division multiplexed signal into the component signals, including the first wavelength signal and the second wavelength signal, and a multiplexer configured to multiplex the equalized component signals into an output signal.

5. The apparatus according to claim 1 further comprising a beam splitter optically coupled in free-space to the diffractive light modulator for receiving the first and second equalized wavelength signals and for re-directing a representative portion of each of the equalized component signals.

6. An integrated apparatus for selectively adjusting power levels of component signals of a wavelength division multiplexed signal including a first wavelength signal and a second wavelength signal, the apparatus comprising:
   a. a diffractive light modulator with a first pixel configured to receive the first wavelength signal and a second pixel configured to receive the second wavelength signal, wherein each pixel is controllable to selectively direct a received signal in a first mode and a second mode, thereby forming a first equalized wavelength signal and a second equalized wavelength signal;
   b. an optical array detector optically coupled to each pixel using free-space optics for collecting a representative portion of the first equalized wavelength signal and a representative portion of the second equalized wavelength signal and for detecting relative power levels associated with each collected representative portion; and
   c. a controller electrically coupled to the optical array detector and the diffractive light modulator for receiving the detected power levels from the optical performance monitor and for dynamically modulating the first and the second pixels of the diffractive light modulator to maintain a desired level of power in the first mode for each pixel relative to each other,
   whereby the diffractive light modulator, the optical performance monitor and the controller are integrally coupled to form the integrated apparatus.

7. The apparatus according to claim 6 wherein the optical array detector comprises an imaging lens and a photo diode array including a first photo diode and a second photo diode wherein the imaging lens directs the representative portion of the first equalized wavelength signal onto the first photo diode and directs the representative portion of the second equalized wavelength signal onto the second photo diode such that the first and second photo diodes detect the power levels proportional to the first and second equalized wavelength signals, respectively.

8. The apparatus according to claim 7 wherein the optical array detector is optically coupled to each pixel by a pick-up beam splitter such that the pick-up beam splitter intersects each equalized wavelength signal in free-space and directs the representative portion of the first equalized wavelength signal and the representative portion of the second wavelength signal to the imaging lens of the optical performance monitor.

9. The apparatus according to claim 6 wherein the first wavelength signal, the second wavelength signal, the first equalized wavelength signal and the second equalized wavelength signal are directed using free space optics.

10. The apparatus according to claim 6 wherein the first mode comprises a reflection mode and further wherein the second mode comprises a diffraction mode.

11. The apparatus according to claim 6 further comprising a demultiplexer configured to de-multiplex the wavelength division multiplexed signal into the component signals, including the first wavelength signal and the second wavelength signal, and a multiplexer configured to multiplex the first and second equalized wavelength signals into an output signal.

12. The apparatus of claim 11 wherein the multiplexer and the demultiplexer comprise separate components.

13. The apparatus of claim 11 wherein the multiplexer and the demultiplexer comprise a bi-directional multiplexer/demultiplexer.

14. The apparatus of claim 11 wherein the demultiplexer comprises a dispersion device.

15. The apparatus of claim 14 wherein the dispersion device comprises a prism.

16. The apparatus of claim 14 wherein the dispersion device comprises a grating.

17. The apparatus of claim 7 wherein the imaging lens of the optical array detector comprises a lens array.

18. An integrated apparatus for selectively adjusting power levels of component signals of a wavelength division multiplexed signal including a first wavelength signal and a second wavelength signal, the apparatus comprising:

a. means for equalizing the component signals comprising a first pixel configured to receive the first wavelength signal and a second pixel configured to receive the second wavelength signal, wherein each pixel is controllable to selectively direct a received signal into a first mode and a second mode, thereby forming a first equalized wavelength signal and a second equalized wavelength signal;

b. means for collecting a representative portion of the first equalized wavelength signal and a representative portion of the second equalized wavelength signal, wherein the means for collecting is coupled to the means for equalizing using free-space optics;

c. means for detecting relative power levels associated with each collected representative portion; and d. means for controlling the first and the second pixels in response to the detected power levels to maintain a desired level of power in the first mode for each pixel relative to each other, whereby the means for equalizing, the means for collecting, the means for detecting and the means for controlling are integrally coupled to form the integrated apparatus.

* * * * *